United States Patent
Okada

(10) Patent No.: US 7,796,967 B2
(45) Date of Patent: Sep. 14, 2010

(54) NOISE REMOVAL APPARATUS

(75) Inventor: Hiroki Okada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 530 days.

(21) Appl. No.: 11/937,130

(22) Filed: Nov. 8, 2007

(65) Prior Publication Data

US 2008/0171526 A1 Jul. 17, 2008

(30) Foreign Application Priority Data

Nov. 13, 2006 (JP) ............... 2006-306320

(51) Int. Cl.
*H04B 1/10* (2006.01)
*H04B 1/00* (2006.01)
(52) U.S. Cl. .............. 455/296; 455/63.1; 455/310
(58) Field of Classification Search .......... 455/278.1, 455/296, 310, 114.2, 135, 570, 63.1, 67.13; 375/346; 381/13, 71.1, 94.1
See application file for complete search history.

(56) References Cited

U.S. PATENT DOCUMENTS 5,036,543 A * 7/1991 Ueno ................ 381/13
5,929,929 A * 7/1999 Yang ................ 348/565
6,993,309 B2 * 1/2006 Tsujishita et al. ........ 455/296
7,142,834 B2 * 11/2006 Miyagi ............. 455/296
7,266,062 B2 * 9/2007 Kurihara ............ 369/47.44
7,706,542 B2 * 4/2010 Suganuma ........... 381/13

FOREIGN PATENT DOCUMENTS

| JP | 5-90984 | 4/1993 |
| JP | 2004-48397 | 2/2004 |
| JP | 2004-64563 | 2/2004 |
| JP | 2004-304670 | 10/2004 |

* cited by examiner

*Primary Examiner*—Sonny Trinh
(74) *Attorney, Agent, or Firm*—Oblon, Spivak, McClelland, Maier & Neustadt, L.L.P.

(57) ABSTRACT

An object of the present invention is to provide a noise removal apparatus, of a simplified configuration, capable of removing a noise. A band separation section 351 separates an inputted digital signal into a digital signal D1 and a digital signal D2 by using, as a boundary, the center frequency of a frequency band of the inputted digital signal. The phase adjustment section 352 adjusts a level and a frequency band of the digital signal D2, and outputs, as a removal signal R, a signal for which the level and the frequency band have been adjusted. The adder 353 adds the removal signal R to the digital signal D1, thereby enabling a signal obtained by removing an in-vehicle noise from the digital signal D1 to be outputted as a corrected signal A.

10 Claims, 28 Drawing Sheets

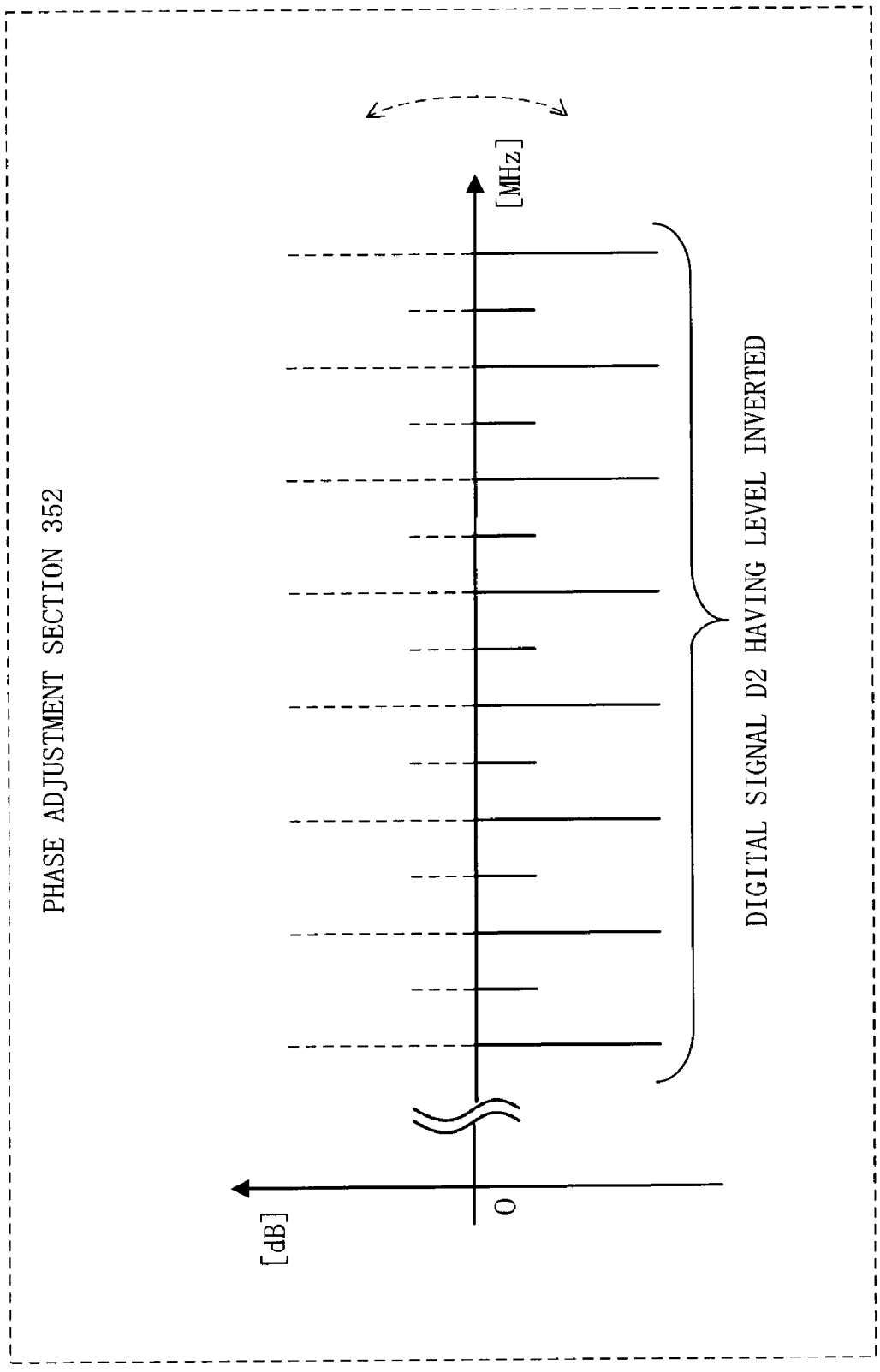

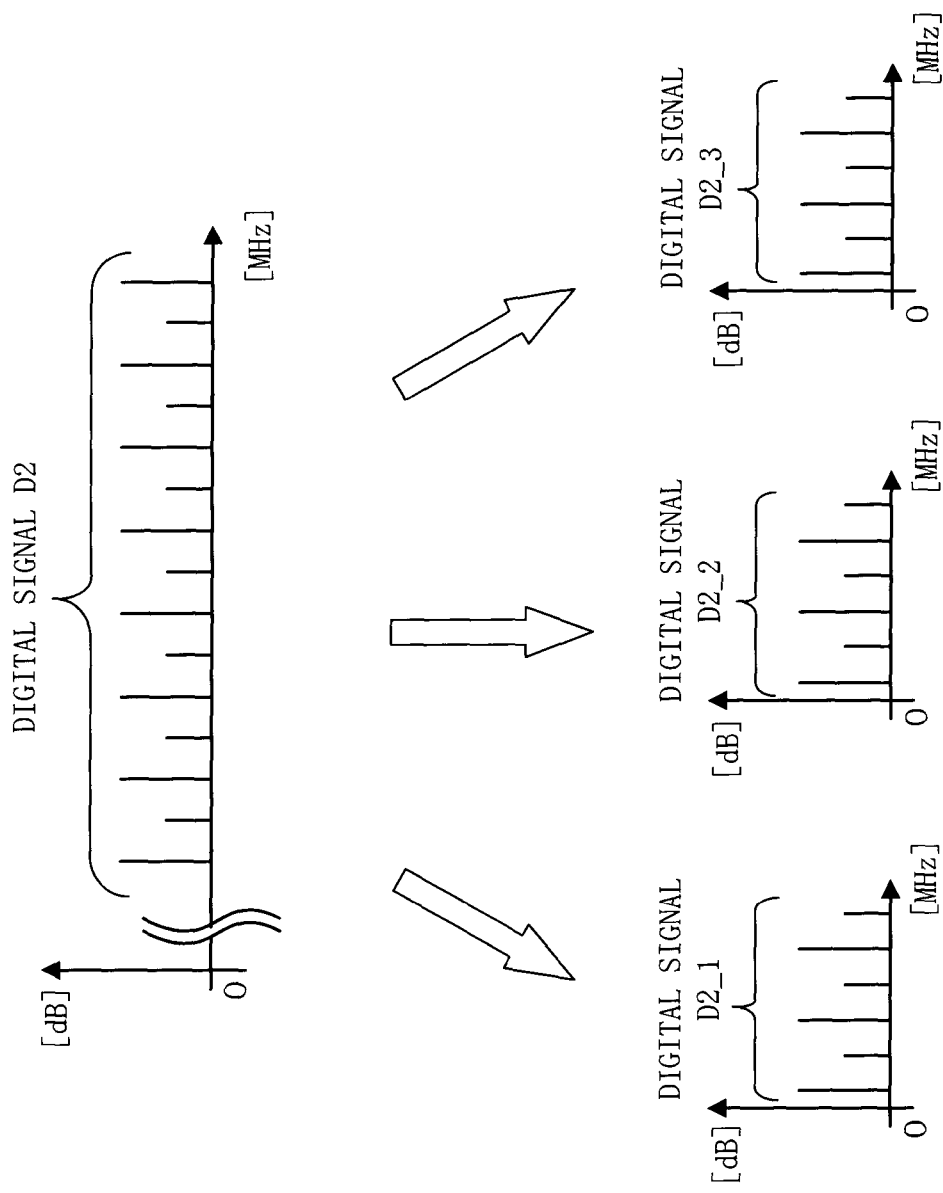

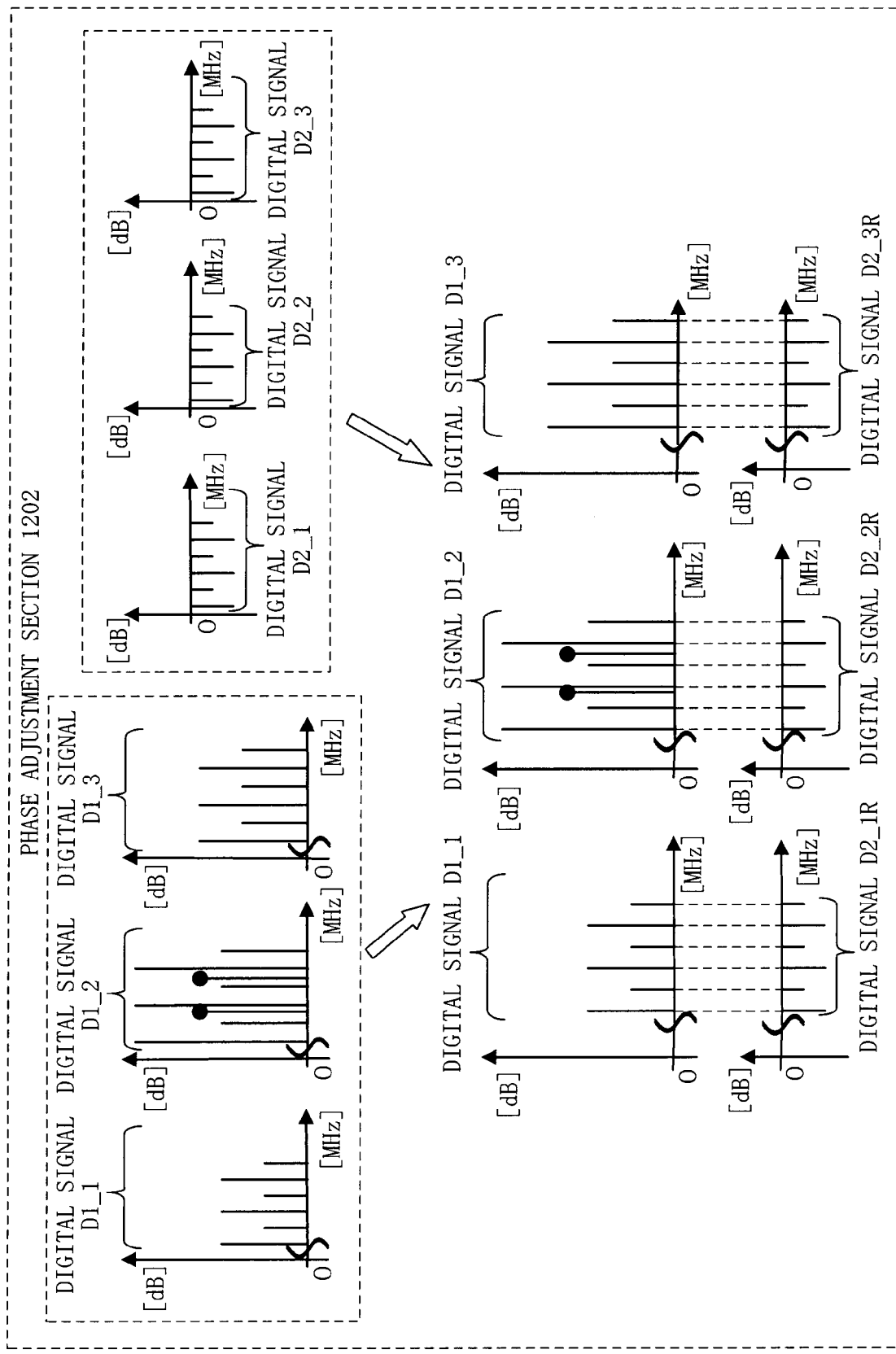

NOISE REMOVAL APPARATUS

BACKGROUND OF THE INVENTION

1. Field of the Invention

The present invention relates to a noise removal apparatus, and more particularly to a noise removal apparatus mounted in a vehicle or the like.

2. Description of the Background Art

A radio communication apparatus includes a lot of electrical circuits. Further, the radio communication apparatus includes a highly sensitive reception section so as to receive a communication signal of a high level. Therefore, as is conventionally known, a signal received by the radio communication apparatus includes not only the communication signal but also a noise (hereinafter, referred to as an internal noise) generated in the electrical circuits of the radio communication apparatus itself. Therefore, various methods have been conventionally devised for removing the internal noise from the signal received by the radio communication apparatus.

FIG. 21 is a block diagram illustrating an outline of a configuration of a radio communication apparatus disclosed in Japanese Laid-Open Patent Publication No. 2004-304670. The radio communication apparatus 210 shown in FIG. 21 includes: a first antenna 211; a second antenna 212; a first front end 213; a second front end 214; a first baseband processor 215; a second baseband processor 216; a calculation section 217; and an amplification wave-detector 218.

The first antenna 211 receives a signal including a desired communication signal and an internal noise. The second antenna 212 receives an internal noise. The first front end 213 frequency-converts, to a baseband signal, the signal received by the first antenna 211, and outputs, to the first baseband processor 215, the baseband signal obtained by the frequency-conversion. The second front end 214 frequency-converts, to a baseband noise signal, the internal noise received by the second antenna 212, and outputs, to the second baseband processor 216, the baseband noise signal obtained by the frequency-conversion. The first baseband processor 215 normalizes an amplitude of the baseband signal outputted by the first front end 213, and converts, to a digital baseband signal, the baseband signal having its amplitude normalized. The second baseband processor 216 normalizes an amplitude of the baseband noise signal outputted by the second front end 214, and converts, to a digital baseband noise signal, the baseband noise signal having its amplitude normalized.

The calculation section 217 performs, as a preprocessing, a process of storing noise difference information. The calculation section 217 removes, when performing communication, the internal noise from the digital baseband signal by using a noise differential signal having been previously stored, so as to output, as an estimated received signal, the digital baseband signal which does not include the internal noise. The preprocessing and an operation for communication which are performed by the calculation section 217 will be described below in detail.

The amplification wave-detector 218 controls an amplification rate used by each of the first baseband processor 215 and the second baseband processor 216, in accordance with a signal intensity of the estimated received signal outputted by the calculation section 217 so as to normalize, in an appropriate manner, an amplitude of the digital baseband signal outputted by the first baseband processor 215, and an amplitude of the digital baseband noise signal outputted by the second baseband processor 216.

Next, the preprocessing performed by the calculation section 217 will be described. The calculation section 217 performs the preprocessing in a state where the radio communication apparatus 210 receives neither a desired communication signal nor a noise (hereinafter, referred to as an external noise) generated outside the radio communication apparatus 210. Thus, the signal received by the first antenna 211 includes only the internal noise. Therefore, the digital baseband signal outputted by the first baseband processor 215 includes only the internal noise. The calculation section 217 stores, as the noise difference information, a difference between the digital baseband signal and the digital baseband noise signal. That is, the preprocessing is a process of previously storing information representing a difference between a level of the internal noise received by the first antenna 211 and a level of the internal noise received by the second antenna 212.

Next, an operation for communication performed by the calculation section 217 will be described. The calculation section 217 calculates, when performing communication, a difference between the noise difference information having been previously stored and the baseband noise signal outputted by the second baseband processor 216 (hereinafter, a calculation result will be referred to as an estimated internal noise). Thus, the calculation section 217 is allowed to estimate a level of the internal noise included in the baseband signal outputted by the first baseband processor 215. Next, the calculation section 217 subtracts the estimated internal noise from the baseband signal outputted by the first baseband processor 215, and outputs, as the estimated received signal, the signal obtained by the subtraction. Thus, the calculation section 217 removes only the internal noise from the signal received by the first antenna 211, thereby allowing only the desired communication signal to be outputted.

However, the conventional radio communication apparatus needs to have the second antenna 212 for receiving only the internal noise, in addition to an antenna for performing communication, so as to remove the internal noise. Therefore, a configuration of the conventional radio communication apparatus is complicated. Further, a user of the conventional radio communication apparatus needs to set the second antenna 212 at a position sufficiently near a source from which the internal noise is generated such that the conventional radio communication apparatus allows the calculation section 217 to accurately estimate the internal noise included in the signal received by the first antenna 211. However, when the user is not able to locate the source from which the internal noise is generated, the user is not allowed to set the second antenna 212 at a position sufficiently near the source from which the internal noise is generated. That is, when the user is not able to locate the source from which the internal noise is generated, the conventional radio communication apparatus is not able to accurately estimate the internal noise included in the signal received by the first antenna 211.

Further, the aforementioned conventional radio communication apparatus has one second antenna 212 for receiving the internal noise. However, when there are a plurality of sources from which noises, such as the internal noise and the external noise, are generated, the user needs to additionally set, depending on the number of the sources from which the noises are generated, antennas for receiving the noises, so as to remove the noise in a satisfactory manner. Further, it is necessary to additionally provide the front ends and the baseband processors depending on the number of the antennas to be additionally set.

In general, the radio communication apparatus is fabricated by incorporating therein a lot of electrical circuits of various types, and therefore a plurality of sources from which noises are generated are included in the radio communication apparatus, and it is difficult to accurately locate the sources from which the noises are generated. Accordingly, it is impractical to remove a noise by using the conventional radio communication apparatus.

SUMMARY OF THE INVENTION

Therefore, an object of the present invention is to provide a noise removal apparatus capable of removing a noise without using a plurality of antennas.

In order to attain the object mentioned above, a first aspect of the present invention is directed to a noise removal apparatus for processing a signal including a communication signal having been modulated and a noise, and the noise removal apparatus comprises: a band separation section for separating the signal including the communication signal and the noise into a first signal which includes the communication signal and the noise and a second signal which includes only the noise, by using, as an upper-limit boundary, a center frequency of a frequency band of the communication signal, and outputting the first signal and the second signal; a conversion section for inverting a level of the second signal outputted by the band separation section, performing conversion of a frequency band of the second signal having the level inverted, to a frequency band of the first signal, and outputting, as a removal signal, a signal obtained by the conversion; and an adder for performing addition of the first signal to the removal signal, and outputting, as a corrected signal, a signal obtained by the addition.

In a second aspect based on the first aspect, the conversion section may invert the level of the second signal by shifting a phase of the second signal by 180 degrees.

In a third aspect based on the first aspect, a signal demodulation section for outputting, as a demodulated signal, a signal obtained by demodulating the corrected signal, and a control signal generated by using the corrected signal is further provided, and the conversion section may adjust, in accordance with the control signal, a frequency band of the second signal obtained by the conversion such that frequencies at which the second signal of the frequency band obtained by the conversion has peak values conform to frequencies, respectively, at which the noise included in the first signal has peak values.

In a fourth aspect based on the first aspect, a signal demodulation section for outputting, as a demodulated signal, a signal obtained by demodulating the corrected signal, and a control signal generated by using the corrected signal is further provided, and the conversion section may further increase or reduce, when the control signal indicates that the corrected signal includes the noise having not been removed, the level of the second signal of a frequency band obtained by the conversion so as to reduce the noise included in the corrected signal.

In a fifth aspect based on the third aspect, the conversion section may adjust, when the control signal indicates that a level of the communication signal included in the corrected signal is not 10 dB or more higher than a level of the noise which has not been removed and is included in the corrected signal, the frequency band of the second signal obtained by the conversion such that the frequencies at which the second signal of the frequency band obtained by the conversion has the peak values conform to the frequencies, respectively, at which the noise included in the first signal has the peak values.

In a sixth aspect based on the fourth aspect, when the control signal indicates that a level of the communication signal included in the corrected signal is not 10 dB or more higher than a level of the noise which has not been removed and is included in the corrected signal, the conversion section may increase or reduce the level of the second signal of the frequency band obtained by the conversion such that the level of the communication signal included in the corrected signal is higher than the level of the noise which has not been removed and is included in the corrected signal, and a difference between the level of the communication signal included in the corrected signal and the level of the noise which has not been removed and is included in the corrected signal is further increased.

In a seventh aspect based on the first aspect, a signal demodulation section for outputting, as a demodulated signal, a signal obtained by demodulating the corrected signal, and a signal removal section for performing removal of only a signal obtained by demodulating the communication signal, from the demodulated signal, and outputting, as a noise monitor signal, a signal obtained by the removal, and a control section for generating a control signal in accordance with a level of the noise monitor signal, and outputting the control signal having been generated are further provided, and the conversion section may adjust, when the control signal indicates that the level of the noise monitor signal has a value other than zero, a frequency band of the second signal obtained by the conversion such that frequencies at which the second signal of the frequency band obtained by the conversion has peak values conform to frequencies, respectively, at which the noise included in the first signal has peak values.

In an eighth aspect based on the first aspect, a signal demodulation section for outputting, as a demodulated signal, a signal obtained by demodulating the corrected signal, a signal removal section for performing removal of only a signal obtained by demodulating the communication signal, from the demodulated signal, and outputting, as a noise monitor signal, a signal obtained by the removal, and a control section for generating a control signal in accordance with a level of the noise monitor signal, and outputting the control signal having been generated are further provided, and the conversion section may further increase or reduce, when the control signal indicates that the level of the noise monitor signal has a value other than zero, the level of the second signal of a frequency band obtained by the conversion such that the level of the noise monitor signal is further reduced.

In a ninth aspect based on the first aspect, the noise removal apparatus further comprises: a first separation section for separating the first signal into a plurality of signals, and outputting the plurality of signals; and a second separation section for separating the second signal into a number of signals equal to the plurality of signals obtained by separating the first signal by the first separation section, and outputting the number of signals equal to the plurality of signals, and the conversion section inverts levels of the second signal having been separated by the second separation section, and performing conversion of frequency bands of the second signal which has been separated by the second separation section and has the levels inverted, to frequency bands, respectively, of the first signal having been separated into the plurality of signals by the first separation section, so as to output the removal signal having been separated, and the adder adds the plurality of signals obtained by separating the first signal by the first separation section, to the removal signal, respectively, having been separated, so as to output the corrected signal having been separated, and the noise removal apparatus may further comprise a signal combination demodulation section for outputting, as a demodulated signal, a signal obtained by combining and demodulating the corrected signal having been separated.

In a tenth aspect based on the ninth aspect, an output adjustment section for increasing or reducing levels of the removal signal having been separated such that the levels of the removal signal having been separated conform to levels obtained by inverting levels of the noise included in the first signal having been separated into the plurality of signals by the first separation section, so as to output the removal signal having the levels increased or reduced is further provided, and the adder may add the first signal having been separated into the plurality of signals by the first separation section, to the removal signal which has been separated and outputted by the output adjustment section, so as to output the corrected signal having been separated.

According to the first aspect, the second signal is used to generate the removal signal for removing the noise from the first signal, and therefore the noise removal apparatus having a simplified configuration is allowed to effectively remove a noise which occurs at regular intervals.

According to the second aspect, it is possible to invert the level of the second signal without using a specific configuration including, for example, an amplifier dedicated to inverting the level of the second signal.

According to the third aspect, even when a frequency at which the noise included in the first signal occurs changes with the passage of time, it is possible to effectively remove the noise from the first signal.

According to the fourth aspect, even when the level of the noise included in the first signal varies with the passage of time, it is possible to effectively remove the noise from the first signal.

According to the fifth aspect, it is possible to adjust the frequency band of the second signal obtained by the conversion such that the level of the communication signal included in the corrected signal continues to be 10 dB or more higher than the level of the un-removed noise included in the corrected signal. Therefore, the signal demodulation section is allowed to continue to securely demodulate the corrected signal.

According to the sixth aspect, it is possible to increase or reduce the level of the second signal of the frequency band obtained by the conversion such that the level of the communication signal included in the corrected signal continues to be 10 dB or more higher than the level of the un-removed noise included in the corrected signal. Therefore, the signal demodulation section is allowed to continue to securely demodulate the corrected signal.

According to the seventh aspect, the conversion section is allowed to adjust the frequency band of the second signal obtained by the conversion, in accordance with the level of the noise included in the demodulated signal. Therefore, the signal demodulation section is allowed to continue to obtain a satisfactory demodulation result.

According to the eighth aspect, the conversion section is allowed to adjust the level of the second signal of the frequency band obtained by the conversion, in accordance with the level of the noise included in the demodulated signal. Therefore, the signal demodulation section is allowed to continue to obtain a satisfactory demodulation result.

According to the ninth aspect, each of the first signal and the second signal is further separated into a plurality of signals, and therefore it is possible to individually adjust the level and the frequency band for each of the plurality of signals of each of the first signal and the second signal.

According to the tenth aspect, it is possible to individually adjust the levels of the removal signal having been separated so as to correspond to the levels, respectively, of the plurality of signals obtained by separating the first signal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7A is a diagram illustrating an operation performed by a phase adjustment section according to the first embodiment;

FIG. 17A is a diagram illustrating an operation performed by a phase adjustment section according to the third embodiment;

FIG. 17C is a diagram illustrating the operation performed by the phase adjustment section according to the third embodiment;

DESCRIPTION OF THE PREFERRED EMBODIMENTS

A vehicle such as an automobile includes a highly sensitive radio communication apparatus for transmitting and receiving a radio wave, and various electronic components. Therefore, a signal received by the radio communication apparatus mounded in the vehicle includes a noise generated by the various electronic components mounted in the vehicle.

Figure 1:
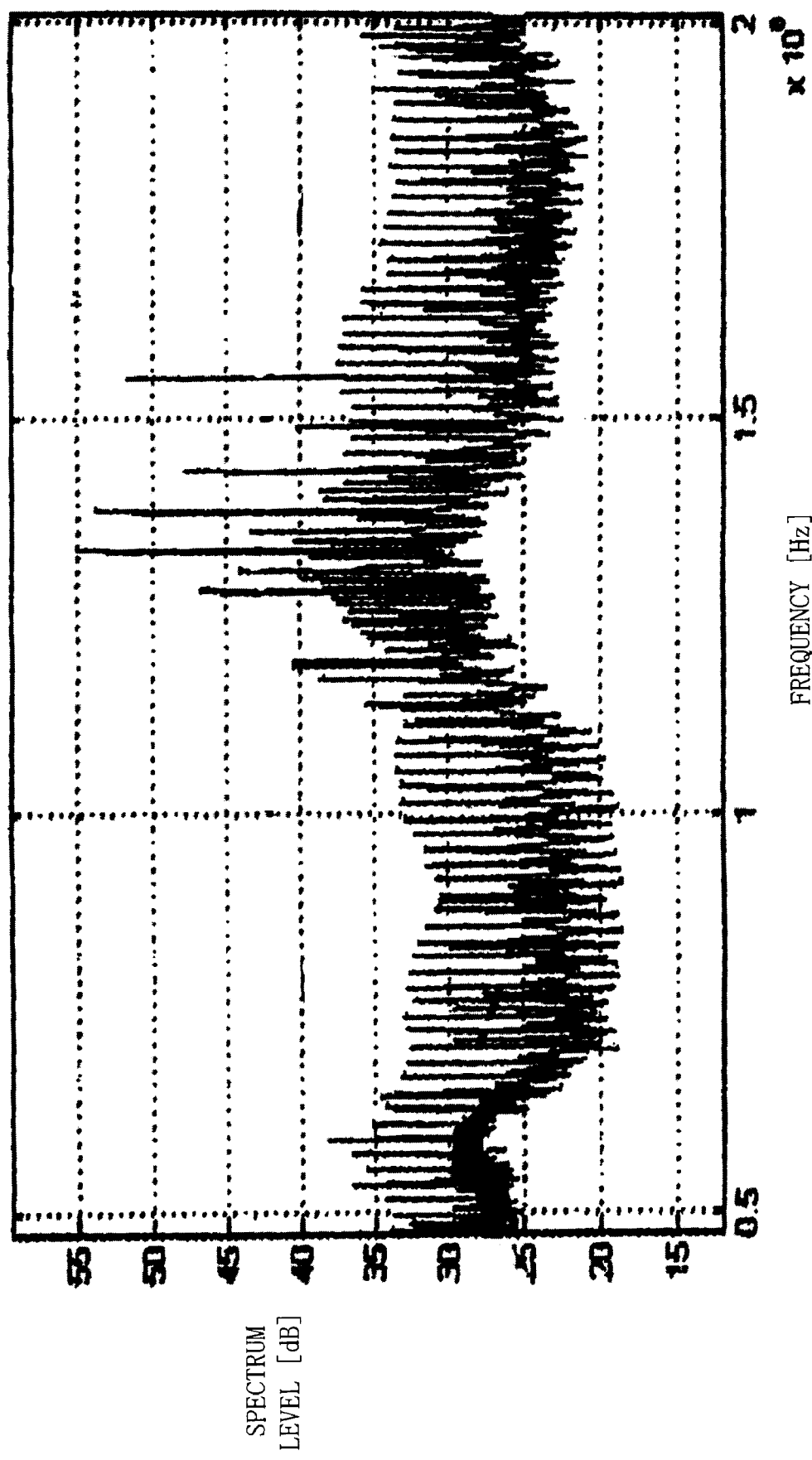
FIG. 1 is a diagram illustrating a frequency spectrum of a signal including a noise occurring at regular intervals.

FIG. 1 shows an observational result of a frequency spectrum of a noise, as an example of the aforementioned noise, generated by a high-voltage inverter mounted in a vehicle such as an automobile. The observational result shown in FIG. 1 indicates that a noise generated by the high-voltage inverter has peaks at intervals of about 20 kHz. The noise adversely affects a radio communication apparatus mounted in a vehicle such as an automobile. Specifically, among others, a radio communication apparatus applied to a device handling a weak radio wave is substantially affected by the noise shown in FIG. 1. The radio communication apparatus applied to the device handling a weak radio wave includes radio communication apparatus applied to, for example, a smart key, a tire air pressure monitor, and an electronic toll collection system (hereinafter, referred to as an ETC).

Figure 2:
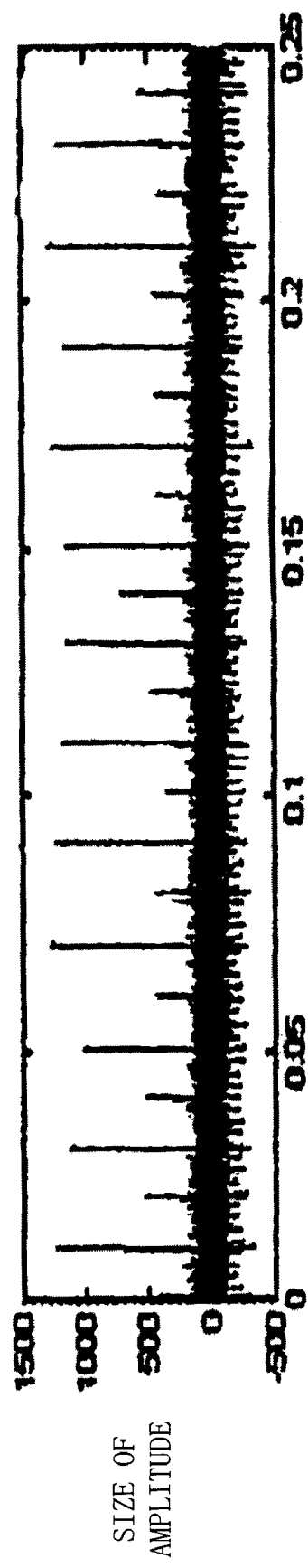
FIG. 2 is a diagram illustrating a frequency spectrum of a noise occurring at regular intervals.

FIG. 2 shows an observational result of a frequency spectrum of a certain frequency band other than a frequency band allocated to the radio communication apparatus, among frequency spectrums of a noise generated by the high-voltage inverter. The observational result shown in FIG. 2 indicates that the noise generated by the high-voltage inverter has peak values of a high level generated at intervals of about 20 kHz, and peak values of a low level generated at intervals of about 10 kHz. Specifically, the noise indicating the observational result shown in FIG. 2 has a feature that, in a certain restricted frequency band, the noise has an almost constant level, and has peaks at almost regular frequency intervals, and the intervals at which the peaks occur exhibit a periodicity.

According to the present invention, the periodicity of the noise (hereinafter, referred to as an in-vehicle noise) indicating the observational result shown in FIG. 2 is utilized so as to remove the in-vehicle noise from a signal received by the radio communication apparatus mounted in a vehicle such as an automobile. Hereinafter, embodiments of the present invention will be described with reference to the drawings.

First Embodiment

Figure 3:
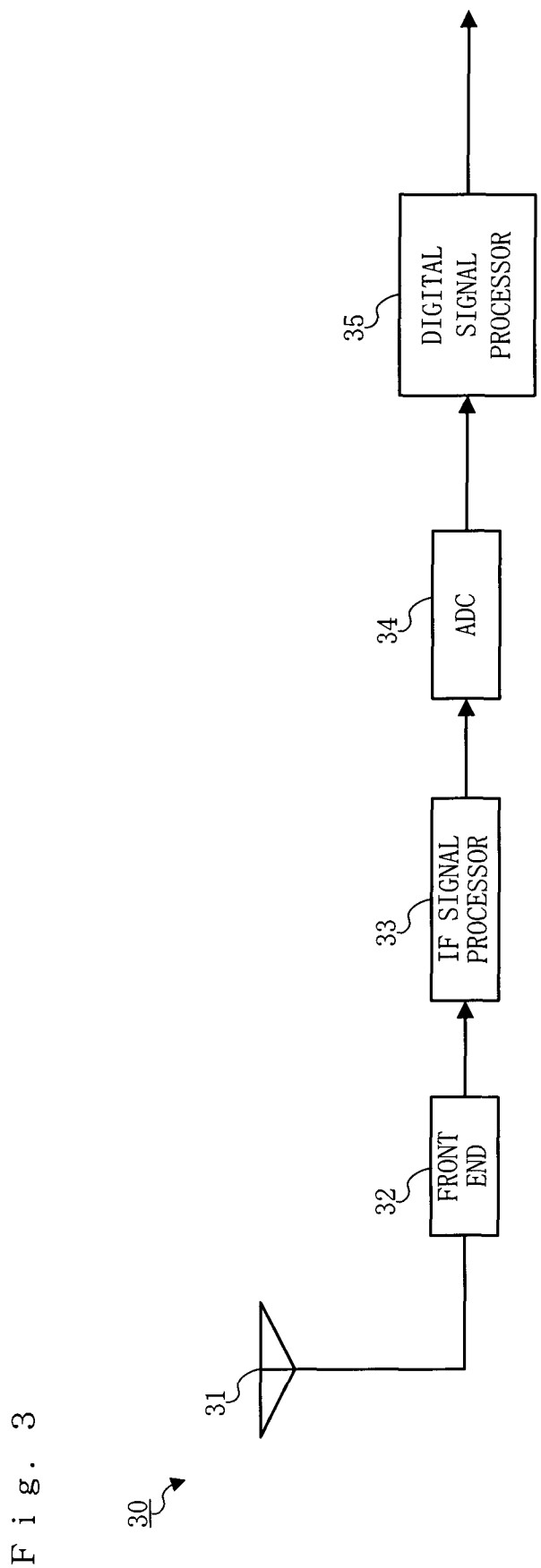
FIG. 3 is a block diagram illustrating an outline of a configuration of a radio communication apparatus according to a first embodiment.

FIG. 3 is a block diagram illustrating an outline of a configuration of a radio communication apparatus 30 including a noise removal apparatus according to a first embodiment of the present invention. The radio communication apparatus 30 shown in FIG. 3 includes: an antenna 31; a front end 32; an intermediate frequency signal processor (hereinafter, referred to as an IF (intermediate frequency) signal processor) 33; an analog to digital converter (hereinafter, referred to as an ADC) 34;, and a digital signal processor 35.

The antenna 31 receives a signal including a communication signal and an in-vehicle noise. The communication signal is a signal obtained by modulation, such as amplitude modulation (AM), frequency modulation (FM), and phase modulation (PM), which is performed in a prescribed manner. Further, a frequency band of the communication signal is a frequency band which is previously allocated to each of the radio communication apparatuses 30 included in a smart key, a tire air pressure monitor, an ETC, an AM radio, and an FM radio.

The front end 32 frequency-converts the signal received by the antenna 31, and outputs, as an intermediate frequency signal, a signal obtained by the frequency-conversion.

The IF signal processor 33 amplifies the intermediate frequency signal outputted by the front end 32, and outputs the amplified intermediate frequency signal as an analog signal.

The ADC 34 performs sampling of the analog signal outputted by the IF signal processor 33 so as to convert the analog signal to a digital signal, and outputs the digital signal. The ADC 34 passes, through a filter included therein, only a digital signal in a frequency band which includes a frequency band of the communication signal and has a frequency bandwidth which is twice a frequency bandwidth of the frequency band of the communication signal, among the digital signal obtained by the conversion. The ADC 34 outputs the digital signal having been passed through the filter.

The digital signal processor 35 removes the in-vehicle noise from the digital signal outputted by the ADC 34, so as to reconstruct, as the communication signal, the digital signal which does not include the in-vehicle noise.

Figure 4:
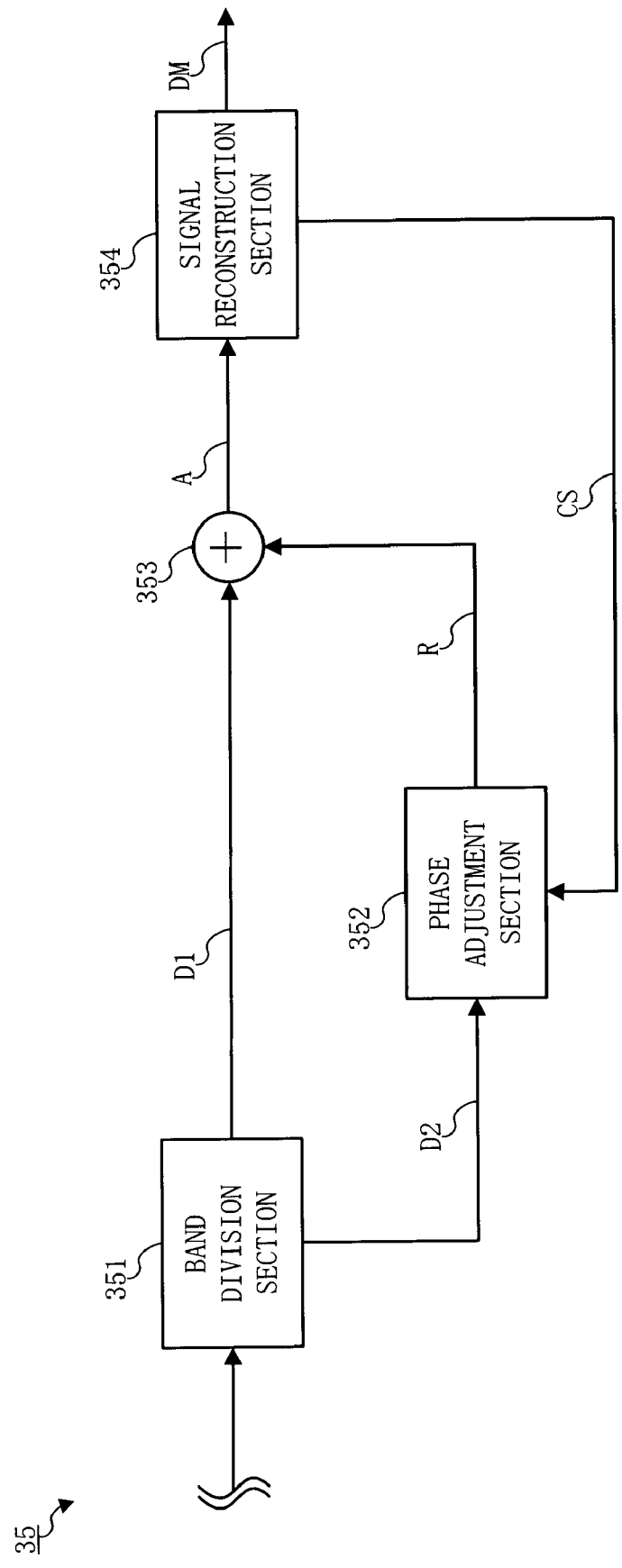
FIG. 4 is a diagram illustrating in detail a configuration of a digital signal processor according to the first embodiment.

FIG. 4 is a block diagram illustrating in detail a configuration of the digital signal processor 35. The digital signal processor 35 includes a band separation section 351, a phase adjustment section 352, an adder 353, and a signal reconstruction section 354.

Figure 5:
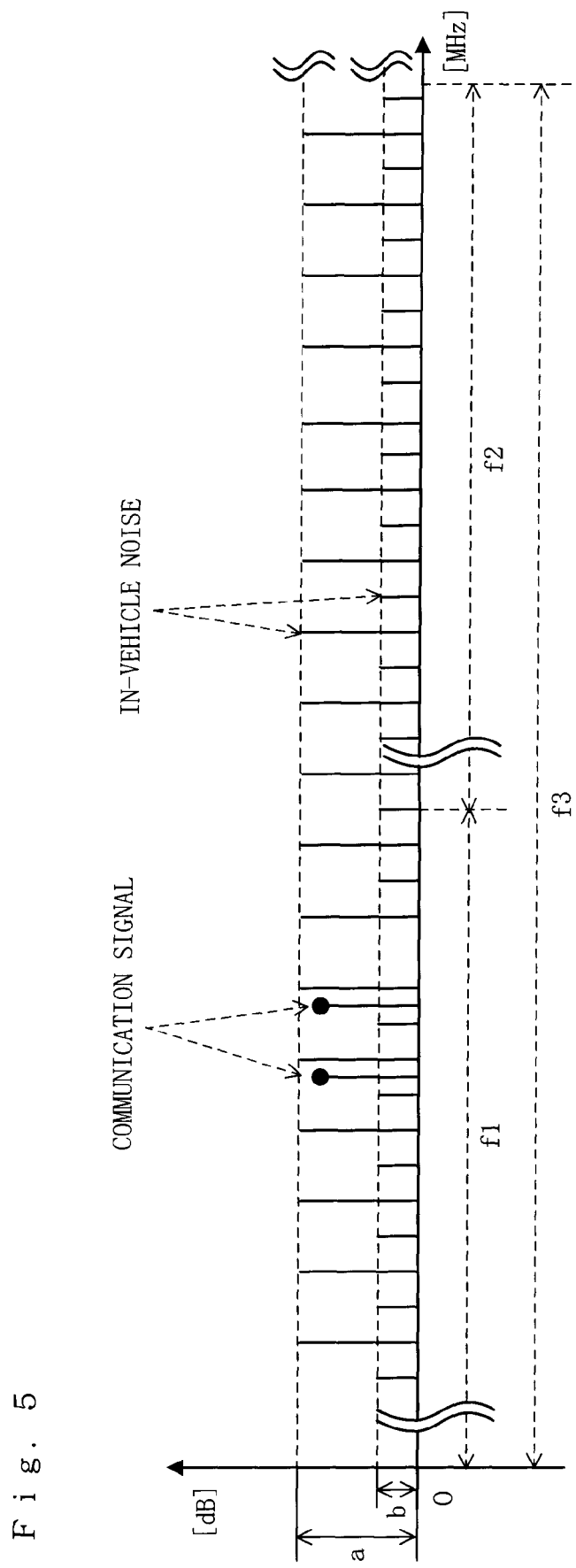
FIG. 5 is a diagram illustrating an outline of a frequency spectrum of a digital signal inputted to the digital signal processor according to the first embodiment.
Figure 6:
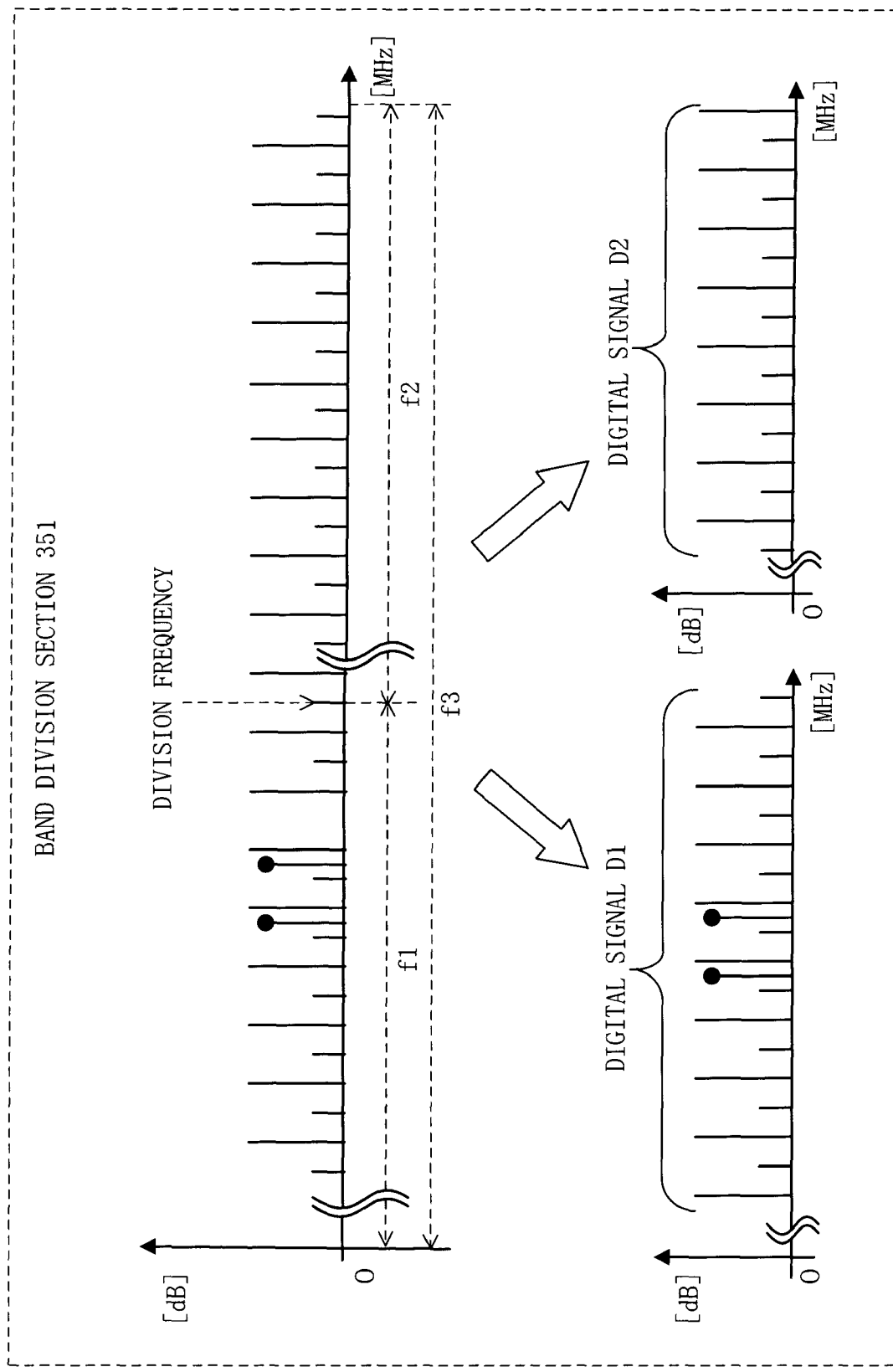
FIG. 6 is a diagram illustrating an operation performed by a band separation section according to the first embodiment.

FIG. 5 is a diagram illustrating a frequency spectrum of the digital signal outputted by the ADC 34. The in-vehicle noise included in the digital signal outputted by the ADC 34 includes a nose having a constant level a, and a noise having a constant level b, as shown in FIG. 5. In FIG. 5, f1 represents a frequency band of the communication signal, and f2 represents a frequency band of only the in-vehicle noise. Further, in FIG. 5, f3 represents a frequency band of the digital signal outputted by the ADC 34. The frequency band f3 has a frequency bandwidth which is twice a frequency bandwidth of the frequency band f1 of the communication signal. FIGS. 6 to 8 are diagrams illustrating a principle of the digital signal processor 35 removing the in-vehicle noise from the digital signal. The digital signal as shown in FIG. 5, which is outputted by the ADC 34, is obtained by the ADC 34 converting, to a digital signal, a signal in which the in-vehicle noise shown in FIG. 2 is superimposed on the communication signal. Hereinafter, with reference to FIGS. 4 to 8, an operation performed by each of the components included in the digital signal processor 35 according to the first embodiment will be described in detail.

FIG. 6 is a diagram illustrating an operation performed by the band separation section 351. The band separation section 351 separates the digital signal outputted by the ADC 34 into a digital signal D1 and a digital signal D2, by using, as a boundary, a separation frequency shown in FIG. 6, and outputs the signals obtained by the separation. The separation frequency is a frequency representing the center of a bandwidth of the frequency band f3 of the digital signal outputted by the ADC 34. Specifically, a frequency bandwidth of the digital signal D1 is equal to a frequency bandwidth of the digital signal D2. Further, the digital signal D1 includes the communication signal and the in-vehicle noise, whereas the digital signal D2 includes only the in-vehicle noise. The method in which the band separation section 351 separates the digital signal will be described below in detail.

Figure 7B:
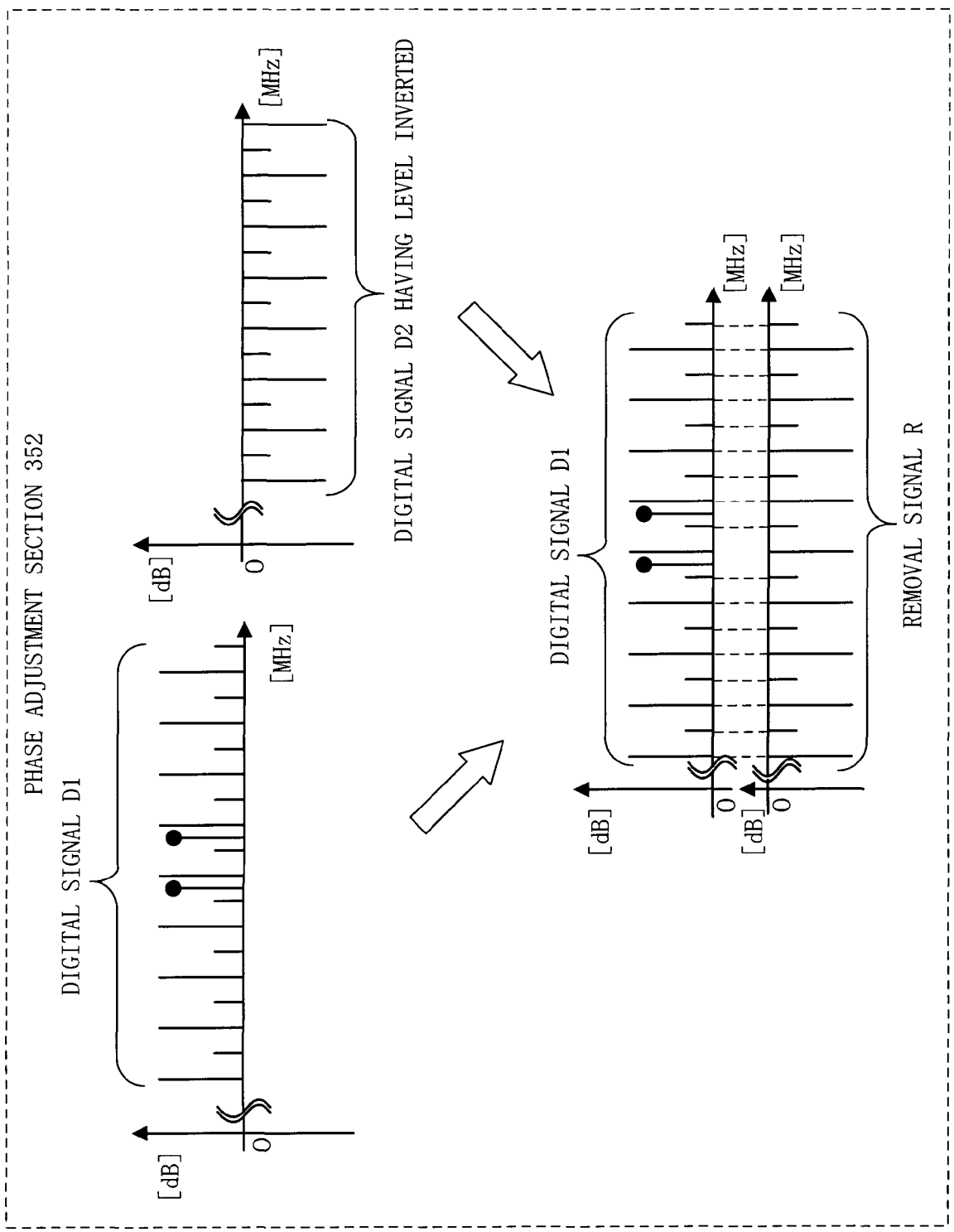
FIG. 7B is a diagram illustrating an operation performed by the phase adjustment section according to the first embodiment.
Figure 8:
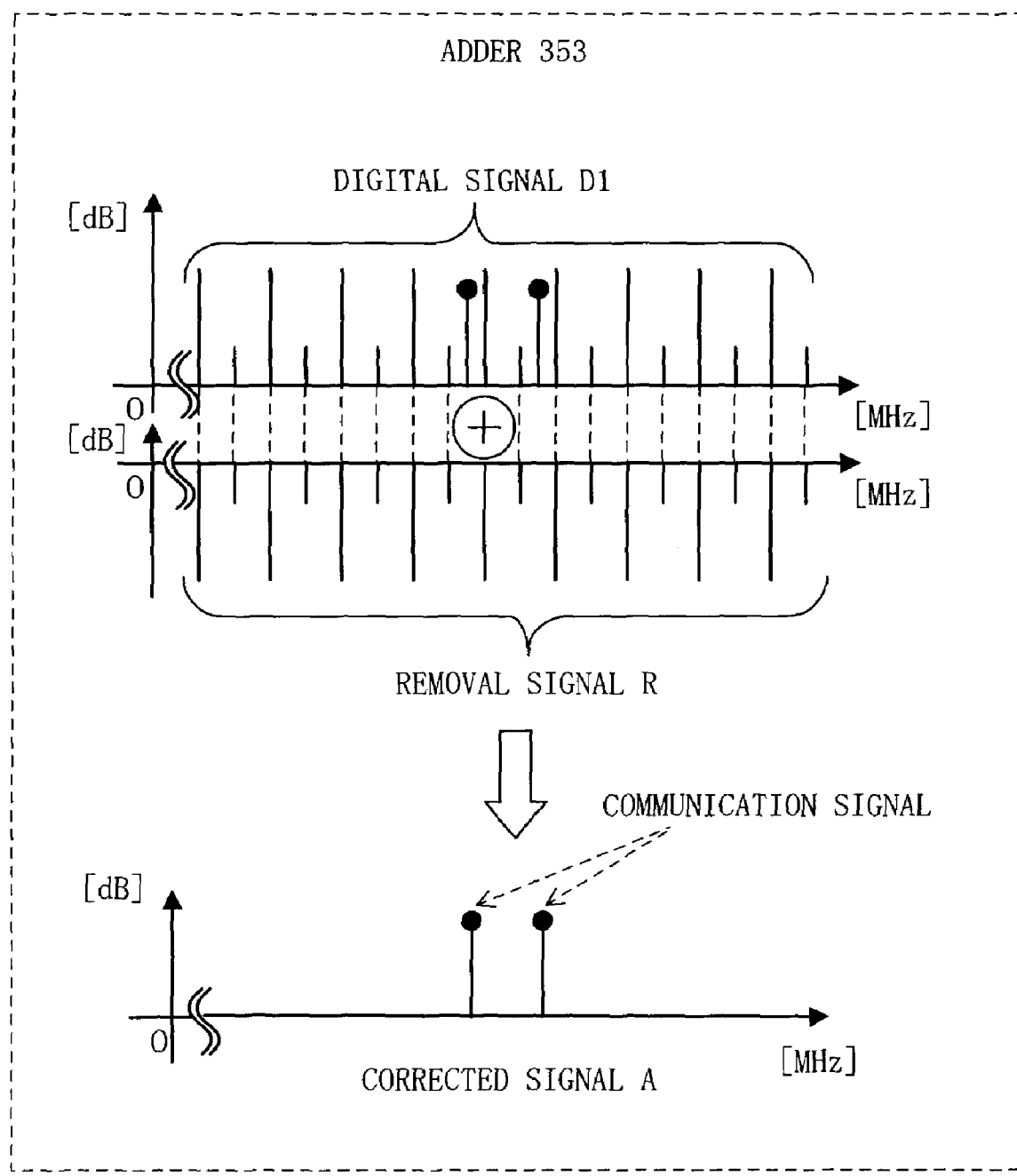
FIG. 8 is a diagram illustrating an operation performed by an adder 353 according to the first embodiment.

FIGS. 7A and 7B are diagram illustrating an operation performed by the phase adjustment section 352. The phase adjustment section 352 adjusts a phase and a frequency band of the digital signal D2. The phase adjustment section 352 outputs the digital signal D2 for which its phase and frequency band have been adjusted, as a removal signal R, to the adder 353. More specifically, the phase adjustment section 352 shifts a phase of the digital signal D2 by 180 degrees, as shown in FIG. 7A. Thus, a level of the digital signal D2 is inverted. The phase adjustment section 352 converts a frequency band of the digital signal D2 having its level inverted, to the frequency band of the digital signal D1, as shown in FIG. 7B, so as to generate and output the removal signal R.

The in-vehicle noise included in the digital signal D1 and the in-vehicle noise included in the digital signal D2 have the same level. Further, intervals of frequencies at which the in-vehicle noise included in the digital signal D1 has the peak values are equal to intervals of frequencies at which the in-vehicle noise included in the digital signal D2 has the peak values. These are features of the in-vehicle noise as shown in FIG. 2. Specifically, when the removal signal R obtained by inverting the level of the digital signal D2 and converting the frequency band of the digital signal D2 having its level inverted so as to conform to the frequency band of the digital signal D1 is added to the digital signal D1, it is possible to cancel only the in-vehicle noise included in the digital signal D1. Further, the phase adjustment section 352 controls at least one of the level and the frequency band of the removal signal R in accordance with a control signal CS outputted by the signal reconstruction section 354. The reason the phase adjustment section 352 controls at least one of the level and the frequency band of the removal signal R in accordance with the control signal CS will be described below.

FIG. 8 is a diagram illustrating an operation performed by the adder 353. The adder 353 adds the digital signal D1 outputted by the band separation section 351 to the removal signal R outputted by the phase adjustment section 352. The adder 353 outputs a signal obtained by the addition, as a corrected signal A, to the signal reconstruction section 354. The corrected signal A outputted by the adder 353 is a signal which includes only the communication signal and does not include the in-vehicle noise, which has been removed from the digital signal D1.

The signal reconstruction section 354 demodulates the corrected signal A outputted by the adder 353 in a modulation method which is previously defined for the communication signal received by the antenna 31, and outputs the demodulated signal as a demodulated signal DM. Further, the signal reconstruction section 354 outputs the control signal CS to the phase adjustment section 352.

The reason the phase adjustment section 352 controls at least one of the level and the frequency band of the removal signal R in accordance with the control signal CS will be described. With the passage of time, the level of the in-vehicle noise varies and intervals at which the in-vehicle noise has the peaks change. Therefore, the corrected signal A may include the in-vehicle noise which has not been removed. Therefore, the phase adjustment section 352 adjusts the frequency band of the removal signal R, in accordance with the control signal CS outputted by the signal reconstruction section 354, such that frequencies at which the removal signal R has peak values conform to respective frequencies at which the in-vehicle noise included in the digital signal D1 have peak values. Alternatively, the phase adjustment section 352 increases or reduces the level of the removal signal R in accordance with the control signal CS outputted by the signal reconstruction section 354. Thus, the phase adjustment section 352 is allowed to generate the removal signal R which is able to remove, in a satisfactory manner, the in-vehicle noise included in the digital signal D1 even when, with the passage of time, the level of the in-vehicle noise included in the digital signal D1 varies and the intervals at which the in-vehicle noise included in the digital signal D1 has peaks change.

The control signal CS may be, for example, a signal indicating that the corrected signal A includes a noise which has not been removed. Therefore, the signal reconstruction section 354 is allowed to notify, by outputting the control signal CS, the phase adjustment section 352 that the corrected signal A includes the noise which has not been removed. Therefore, the phase adjustment section 352 is allowed to control at least one of the level and the frequency band of the removal signal R such that the corrected signal A is prevented from including the noise which has not been removed.

Further, the control signal CS may be, for example, a signal indicating that, in the corrected signal A, a level of the communication signal is not 10 dB or more higher than a level of the noise which has not been removed. Thus, when the signal reconstruction section 354 outputs the control signal CS to the phase adjustment section 352, the phase adjustment section 352 is allowed to control at least one of the level and the frequency band of the removal signal R such that the level of the communication signal included in the corrected signal A is higher than the level of the noise included in the corrected signal A, and a difference between the level of the communication signal included in the corrected signal A and the level of the un-removed noise included in the corrected signal A is further increased.

Figure 9:
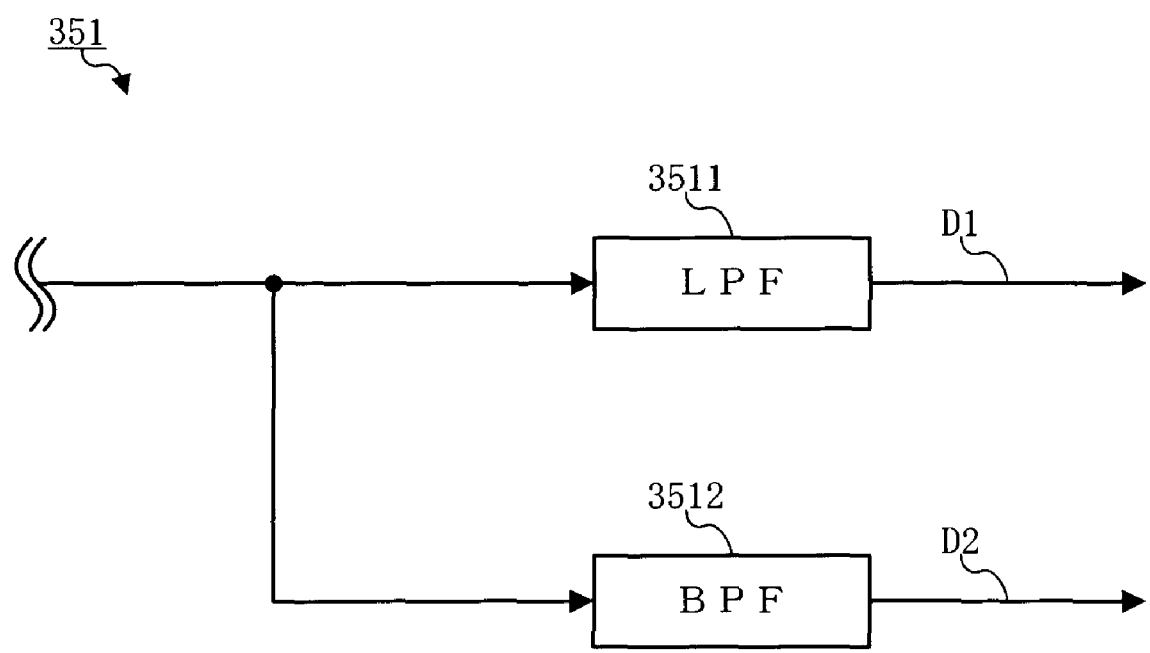
FIG. 9 is a diagram illustrating a specific configuration of the band separation section.

Next, an exemplary method in which the band separation section 351 separates the digital signal will be described. The band separation section 351 includes a low pass filter (hereinafter, referred to as an LPF) 3511, and a bandpass filter (hereinafter, referred to as a BPF) 3512 as shown in FIG. 9. The LPF 3511 passes only a signal, among inputted signals, having a frequency lower than a predetermined frequency. The BPF 3512 passes, among inputted signals, only a signal in a predetermined frequency band. Accordingly, when the LPF 3511 is used so as to pass a signal having a frequency lower than the separation frequency, and the BPF 3512 is used so as to pass a signal having a frequency in a frequency band from the separation frequency to a frequency corresponding to twice the separation frequency, the band separation section 351 is allowed to separate the inputted digital signal by using the separation frequency as the boundary.

The frequency band of the communication signal is previously allocated to a device, such as a smart key, a tire air pressure monitor, an ETC, an AM radio, and an FM radio, including the radio communication apparatus 30. Therefore, both a frequency band of a signal to be passed through the LPF 3511 and a frequency band of a signal to be passed through the BPF 3512 may be preset depending on the devices including the radio communication apparatuses 30. The band separation section 351 uses the LPF 3511 and the BPF 3512, each of which has preset therein the frequency band described above, so as to separate the digital signal outputted by the ADC 34 into the digital signal D1 and the digital signal D2.

The configuration of the band separation section 351 is not restricted to the configuration shown in FIG. 9. The band separation section 351 may have any configuration which is capable of separating the inputted digital signal into two signals in frequency bands having bandwidths equal to each other, by using a desired frequency as the boundary.

As describe above, in the noise removal apparatus according to the first embodiment, the adder 353 adds the digital signal D1 to the removal signal R generated by the phase adjustment section 352 as described above so as to obtain, as the corrected signal A, a signal obtained by removing only the in-vehicle noise from the digital signal D1, and the signal reconstruction section 354 is allowed to demodulate, as the communication signal, the corrected signal A which does not include the in-vehicle noise. Accordingly, the noise removal apparatus having a simplified configuration, is allowed to acquire a satisfactory result of demodulation in which a noise is removed from a received signal.

Second Embodiment

Figure 10:
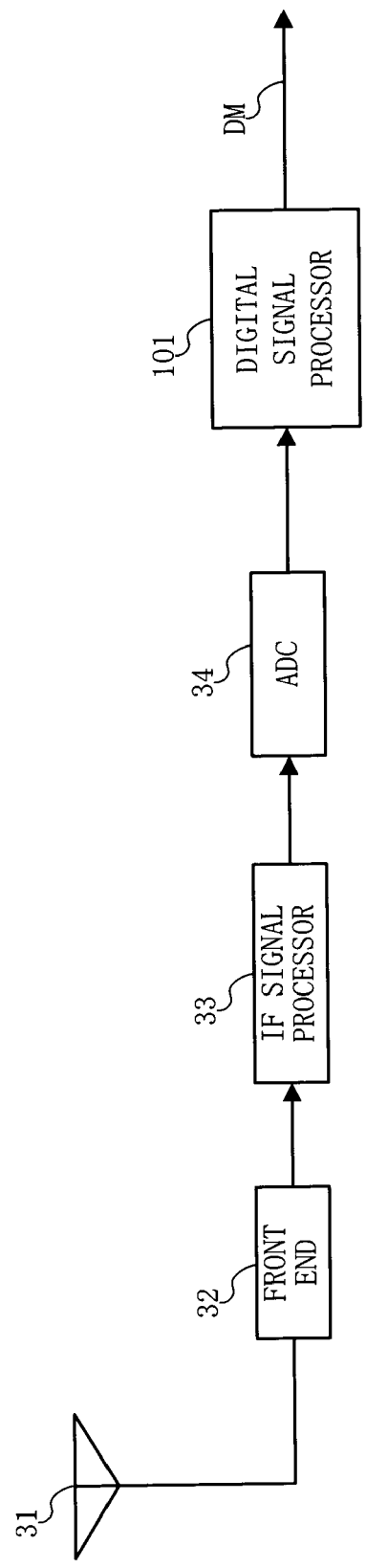
FIG. 10 is a block diagram illustrating an outline of a configuration of a radio communication apparatus according to a second embodiment.
Figure 11:
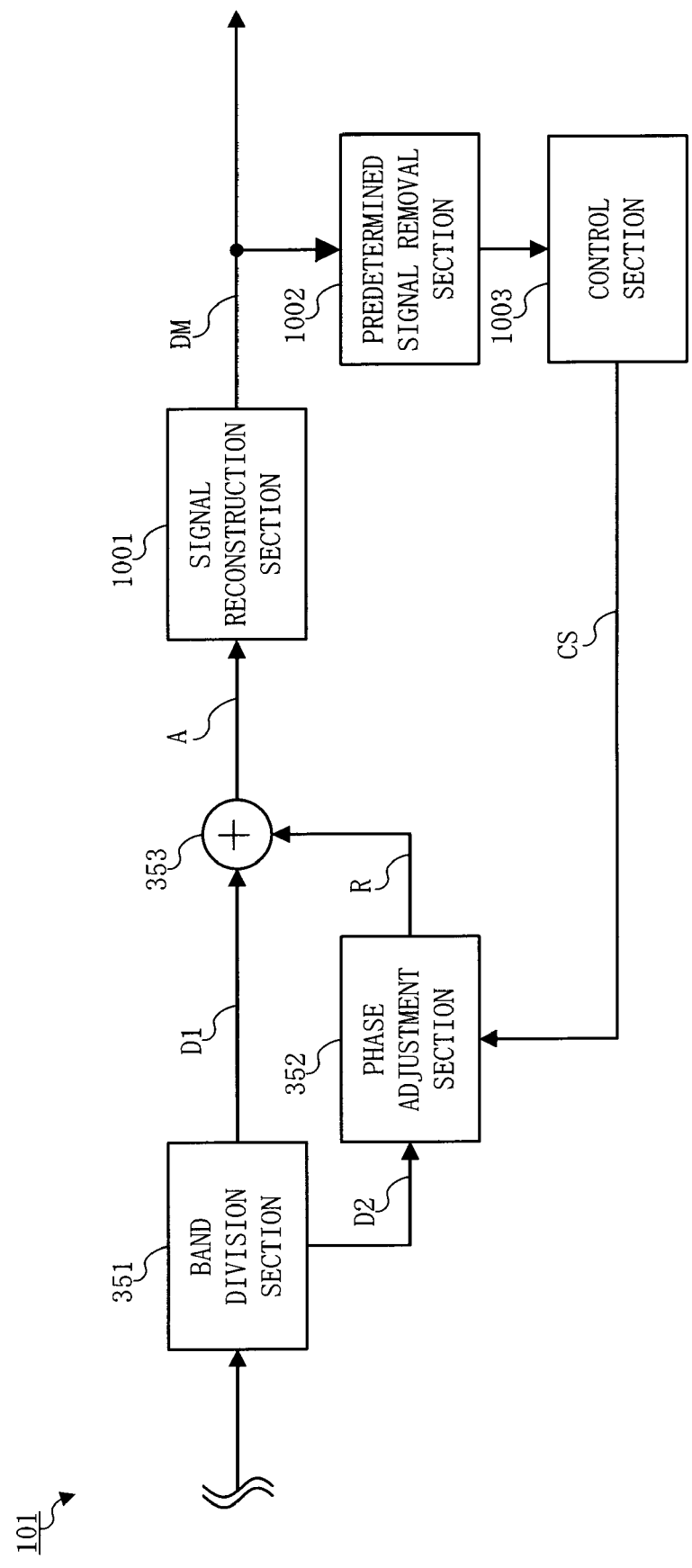
FIG. 11 is a diagram illustrating in detail a configuration of a digital signal processor according to the second embodiment.

FIG. 10 is a block diagram illustrating an outline of a configuration of a radio communication apparatus 100 including a noise removal apparatus according to a second embodiment of the present invention. FIG. 11 is a block diagram illustrating in detail a configuration of a digital signal processor 101 shown in FIG. 10. The radio communication apparatus 100 shown in FIG. 10 has the same configuration as the radio communication apparatus 30 shown in FIG. 3 except that the radio communication apparatus 100 has the digital signal processor 101 shown in FIG. 11 instead of the digital signal processor 35 shown in FIG. 4. More specifically, the digital signal processor 101 shown in FIG. 11 is different from the digital signal processor 35 shown in FIG. 4 in that the digital signal processor 101 includes a signal reconstruction section 1001, a predetermined signal removal section 1002, and a control section 1003. In FIGS. 10 and 11, components of the radio communication apparatus 100 and the digital signal processor 101 which are common to the components of the radio communication apparatus 30 shown in FIG. 3 and the digital signal processor 35 shown in FIG. 4 are denoted by the same corresponding reference numerals, and a detailed description thereof is not given. Hereinafter, with reference to FIG. 11, an operation performed by the digital signal processor 101 according to the second embodiment will be described.

The signal reconstruction section 1001 demodulates the corrected signal A outputted by the adder 353, and outputs, as the demodulated signal DM, a signal obtained by the demodulation.

The predetermined signal removal section 1002 removes only a desired communication signal from the demodulated signal DM, and outputs a signal obtained by removing the desired communication signal, as a noise monitor signal NM, to the control section 1003.

With the passage of time, a level of the in-vehicle noise varies and intervals at which the in-vehicle noise has peaks change. Therefore, the corrected signal A may include the in-vehicle noise which has not been removed. When the signal reconstruction section 1001 demodulates the corrected signal A including the in-vehicle noise which has not been removed, the demodulated signal DM also includes the noise which has not been removed. Therefore, the predetermined signal removal section 1002 removes only the desired communication signal from the demodulated signal DM, so as to output, as the noise monitor signal NM, only an un-removed noise included in the demodulated signal DM. As described above, the frequency band of the communication signal is previously allocated, and therefore it is possible to preset, in the predetermined signal removal section 1002, a frequency band of a signal (that is, the communication signal) to be removed by the predetermined signal removal section 1002.

The control section 1003 generates the control signal CS based on the noise monitor signal NM, and outputs the generated control signal CS to the phase adjustment section 352. The control signal CS may be, for example, a signal indicating that a level of the noise monitor signal has a value other than zero. Thus, the control section 1003 is allowed to notify the phase adjustment section 352 that the level of the noise monitor signal, that is, a level of the un-removed noise included in the corrected signal A, has a value other than zero. Therefore, the phase adjustment section 352 is able to control at least one of a level and a frequency band of the removal signal R so as to reduce a level of the noise included in the corrected signal A. The reason the phase adjustment section 352 controls at least one of the level and the frequency band of the removal signal R, in accordance with the control signal CS outputted by the control section 1003, is the same as described in the first embodiment, and therefore the description thereof is not given here.

According to the second embodiment, the control section 1003 controls the phase adjustment section 352, based on the noise monitor signal NM obtained by removing only the communication signal from the demodulated signal DM. Thus, the radio communication apparatus 100 controls the phase adjustment section 352 based on only the un-removed in-vehicle noise included in the demodulated signal DM. Therefore, the radio communication apparatus 100 according to the second embodiment is allowed to remove the in-vehicle noise with enhanced accuracy as compared to the radio communication apparatus 30 according to the first embodiment.

The control section 1003 may not necessarily control the phase adjustment section 352 such that the level of the noise monitor signal NM has a value of zero. The control section 1003 may control the phase adjustment section 352 such that the level of the noise monitor signal NM has a value within a predetermined range.

Third Embodiment

Figure 12:
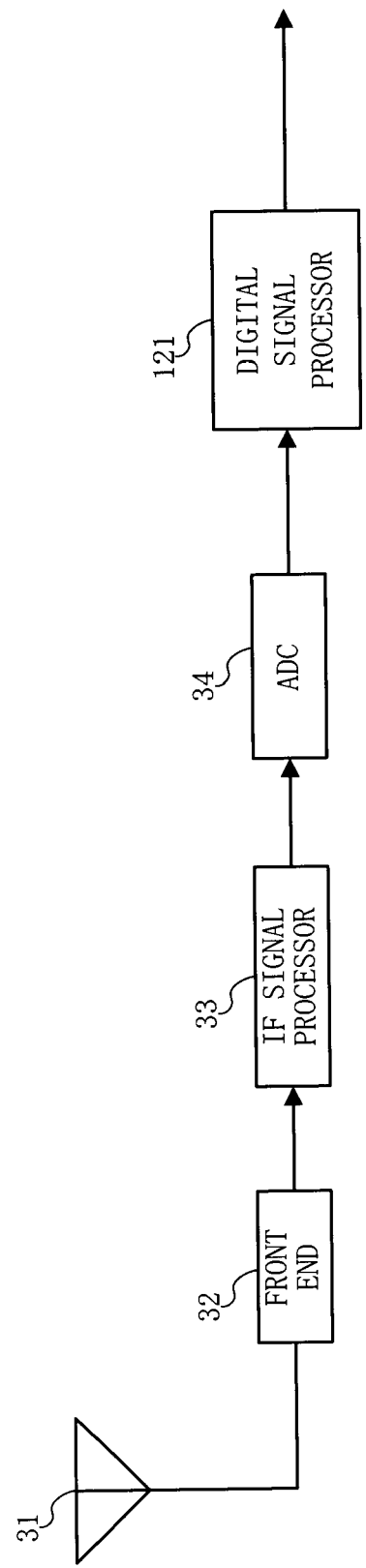
FIG. 12 is a block diagram illustrating an outline of a configuration of a radio communication apparatus according to a third embodiment.
Figure 13:
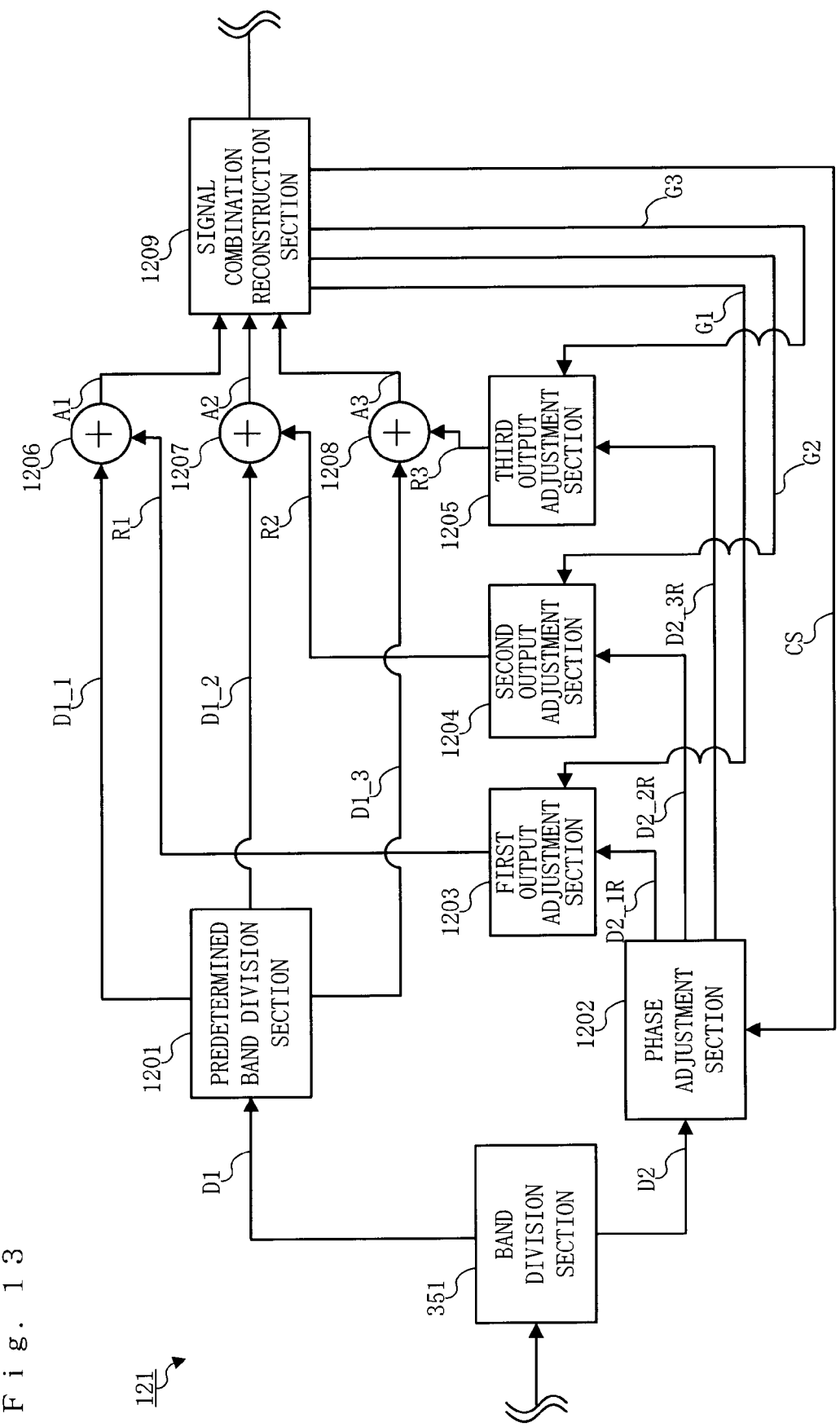
FIG. 13 is a diagram illustrating in detail a configuration of a digital signal processor according to the third embodiment.

FIG. 12 is a block diagram illustrating an outline of a configuration of a radio communication apparatus 120 including a noise removal apparatus according to a third embodiment of the present invention. FIG. 13 is a block diagram illustrating in detail a configuration of a digital signal processor 121 shown in FIG. 12. The radio communication apparatus 120 shown in FIG. 12 has the same configuration as the radio communication apparatus 30 shown in FIG. 3 except that the radio communication apparatus 120 has the digital signal processor 121 shown in FIG. 13 instead of the digital signal processor 35 shown in FIG. 4. In FIGS. 12 and 13, components of the radio communication apparatus 120 and the digital signal processor 121 which are common to the components of the radio communication apparatus 30 shown in FIG. 3 and the digital signal processor 35 shown in FIG. 4 are denoted by the same corresponding reference numerals, and a detailed description thereof is not given.

Figure 14:
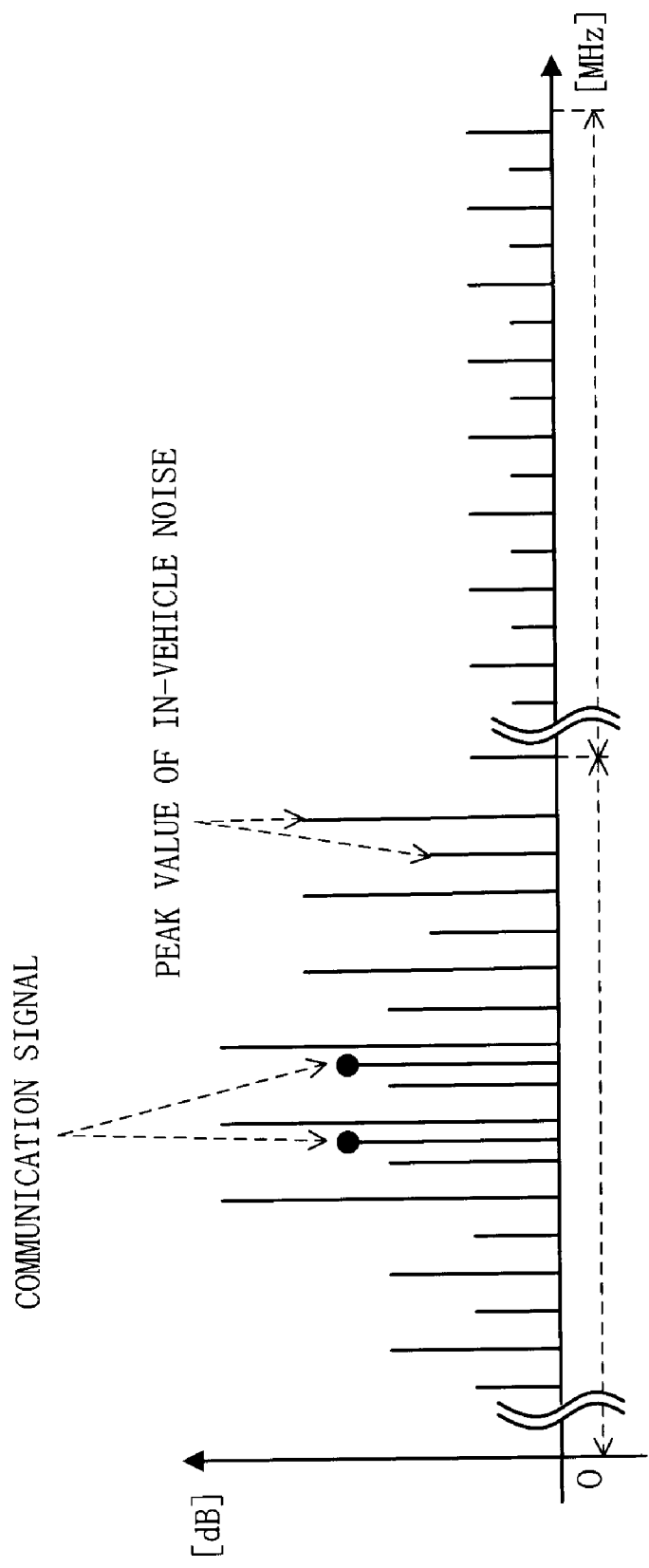
FIG. 14 is a diagram illustrating an outline of a frequency spectrum of a digital signal inputted to the digital signal processor according to the third embodiment.

FIG. 14 is a diagram illustrating a digital signal inputted to the digital signal processor 121. In the third embodiment, an in-vehicle noise included in the digital signal inputted to the digital signal processor 121 does not have a constant level, unlike in the first embodiment. The digital signal processor 121 according to the third embodiment is capable of effectively removing, from the digital signal, even the in-vehicle noise which does not have a constant level.

FIGS. 15 to 20 are diagrams illustrating a method in which the digital signal processor 121 processes a signal. Hereinafter, with reference to FIGS. 13 to 20, an operation performed by the digital signal processor 121 will be described in detail.

The digital signal processor 121 shown in FIG. 13 includes: a band separation section 351; a predetermined band separation section 1201; a phase adjustment section 1202; a first output adjustment section 1203; a second output adjustment section 1204; a third output adjustment section 1205; a first adder 1206; a second adder 1207; a third adder 1208, and a signal combination reconstruction section 1209.

Figure 15:
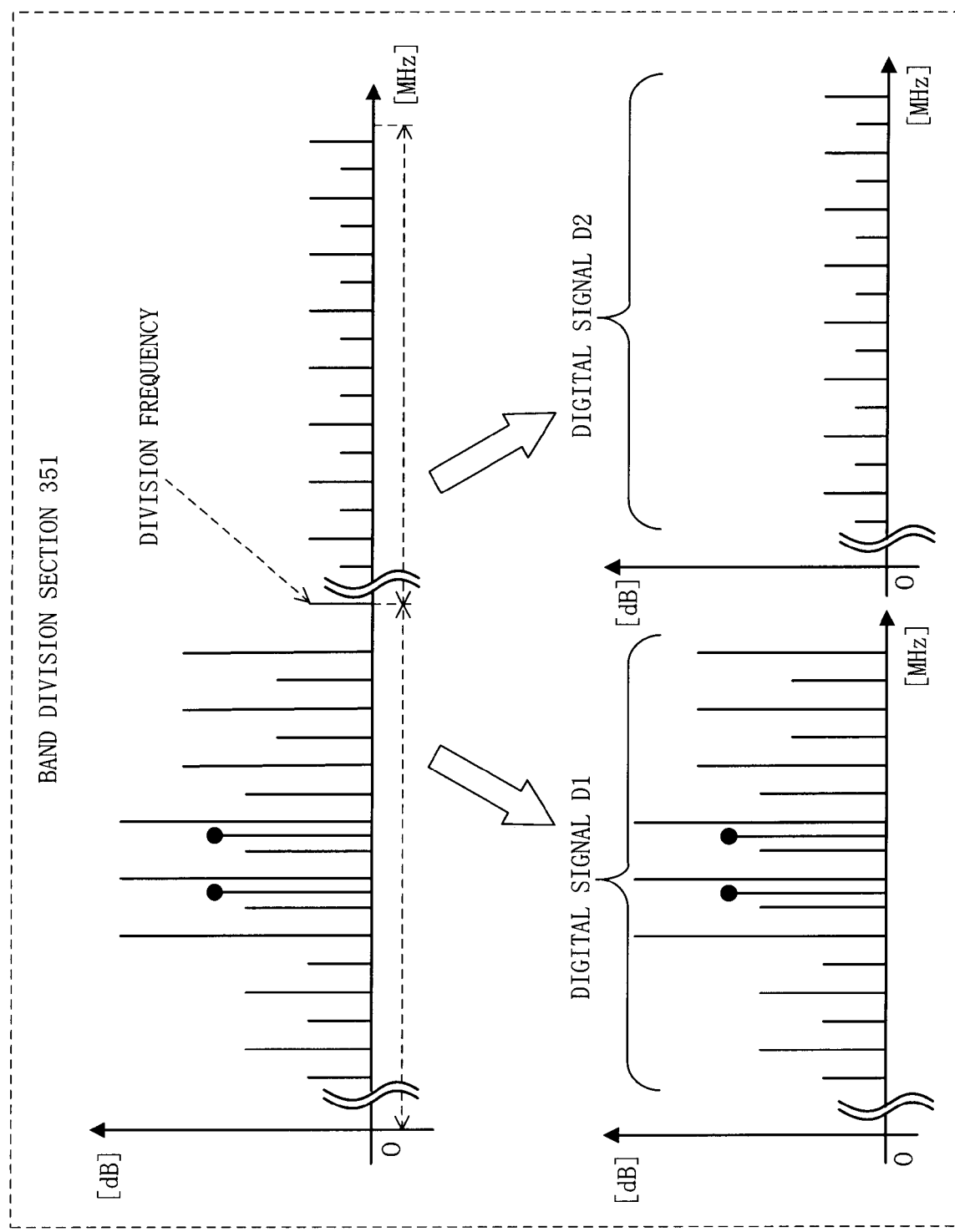
FIG. 15 is a diagram illustrating an operation performed by a band separation section according to the third embodiment.

FIG. 15 is a diagram illustrating an operation performed by the band separation section 351. The band separation section 351 separates a digital signal outputted by the ADC 34 into the digital signal D1 and the digital signal D2 in the same manner as describe for the first embodiment, and therefore a description thereof is not given.

Figure 16:
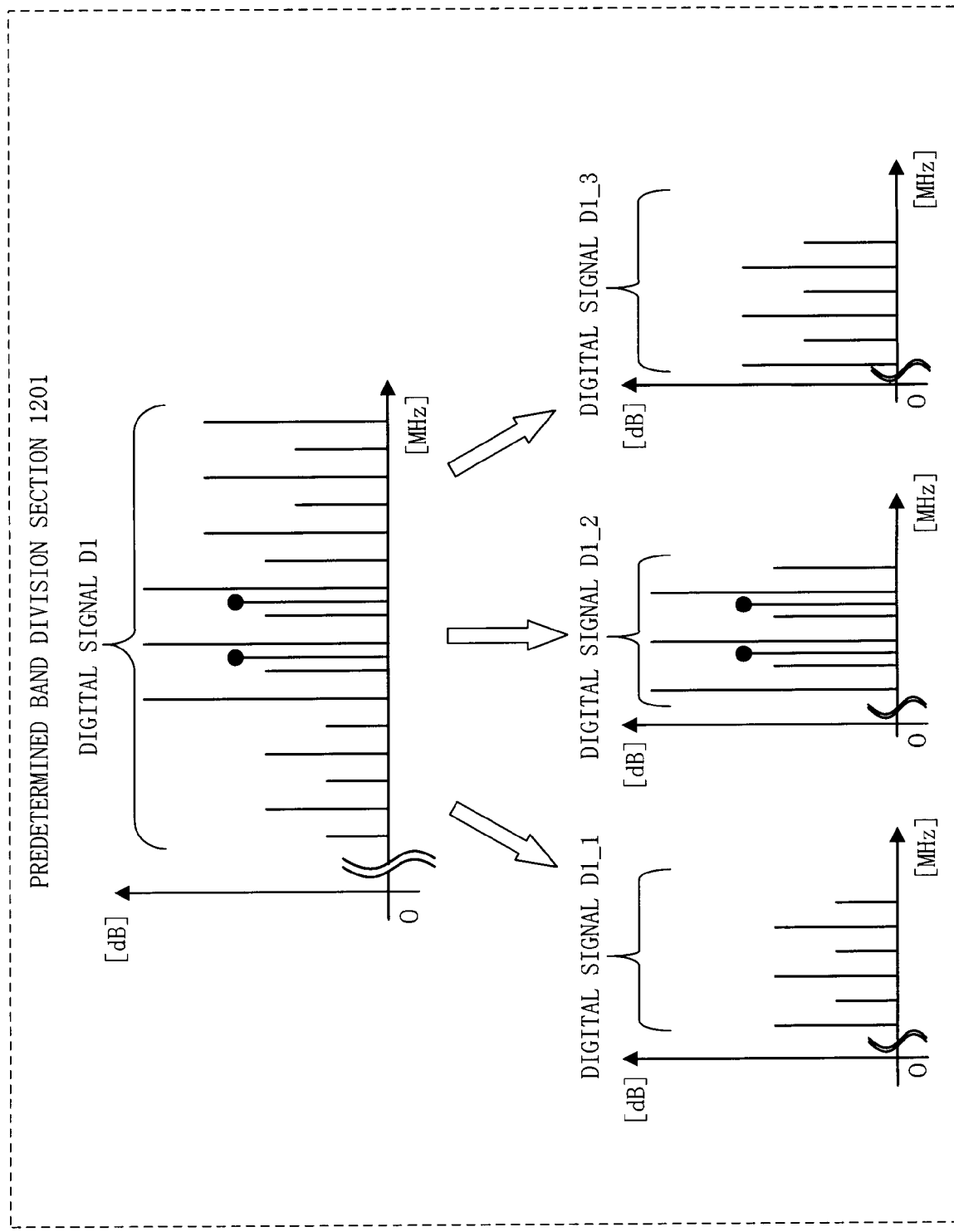
FIG. 16 is a diagram illustrating an operation performed by a predetermined band separation section according to the third embodiment.

FIG. 16 is a diagram illustrating an operation performed by the predetermined band separation section 1201. The predetermined band separation section 1201 separates the digital signal D1 outputted by the band separation section 351 into a digital signal D1_1, a digital signal D1_2, and a digital signal D1_3, in ascending order of frequency, and outputs the signals obtained by the separation. In the present embodiment, the communication signal is included in the digital signal D1_2.

Figure 17B:
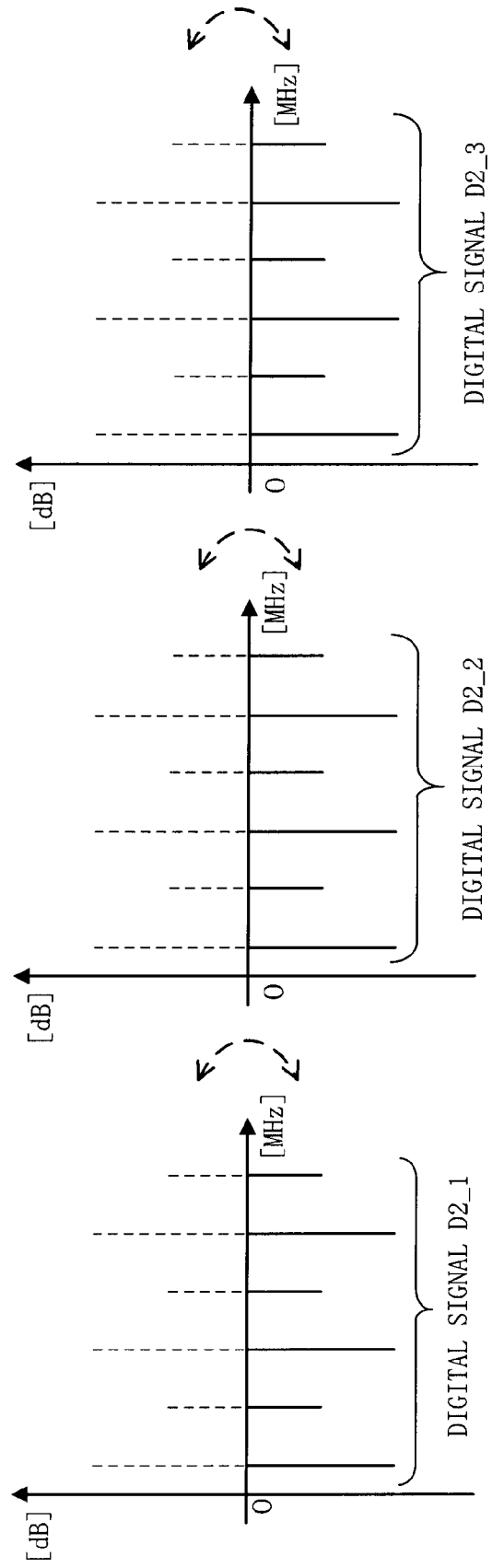
FIG. 17B is a diagram illustrating the operation performed by the phase adjustment section according to the third embodiment.

FIGS. 17A, 17B, and 17C are diagrams illustrating an operation performed by the phase adjustment section 1202. The phase adjustment section 1202 separates the digital signal D2 into three digital signals, that is, a digital signal D2_1, a digital signal D2_2, and a digital signal D2_3, in ascending order of frequency, as shown in FIG. 17A. The phase adjustment section 1202 adjusts a phase and a frequency band of each of the three digital signals obtained by the separation, and outputs the digital signals for each of which the phase and the frequency band have been adjusted.

More specifically, the phase adjustment section 1202 shifts, by 180 degrees, the phase of each of the digital signal D2_1, the digital signal D2_2, and the digital signal D2_3 obtained by the separation, as shown in FIG. 17B. Thus, each of the signals having the phases shifted has a negative level. The phase adjustment section 1202 converts frequency bands of the signals each having the negative level, to frequency bands of the digital signal D1_1, the digital signal D1_2, and the digital signal D1_3, respectively, as shown in FIG. 17C. The signals for each of which the phase and the frequency band have been adjusted by the phase adjustment section 1202 are represented as a digital signal D2_1R, a digital signal D2_2R, and a digital signal D2_3R, respectively.

Further, the phase adjustment section 1202 controls at least one of a level and a frequency band of each of the digital signal D2_1R, the digital signal D2_2R, and the digital signal D2_3R, in accordance with the control signal CS outputted by the signal combination reconstruction section 1209. The reason the phase adjustment section 1202 controls at least one of the level and the frequency band of each of the digital signal D2_1R, the digital signal D2_2R, and the digital signal D2_3R, in accordance with the control signal CS outputted by the signal combination reconstruction section 1209, will be described below.

Figure 18A:
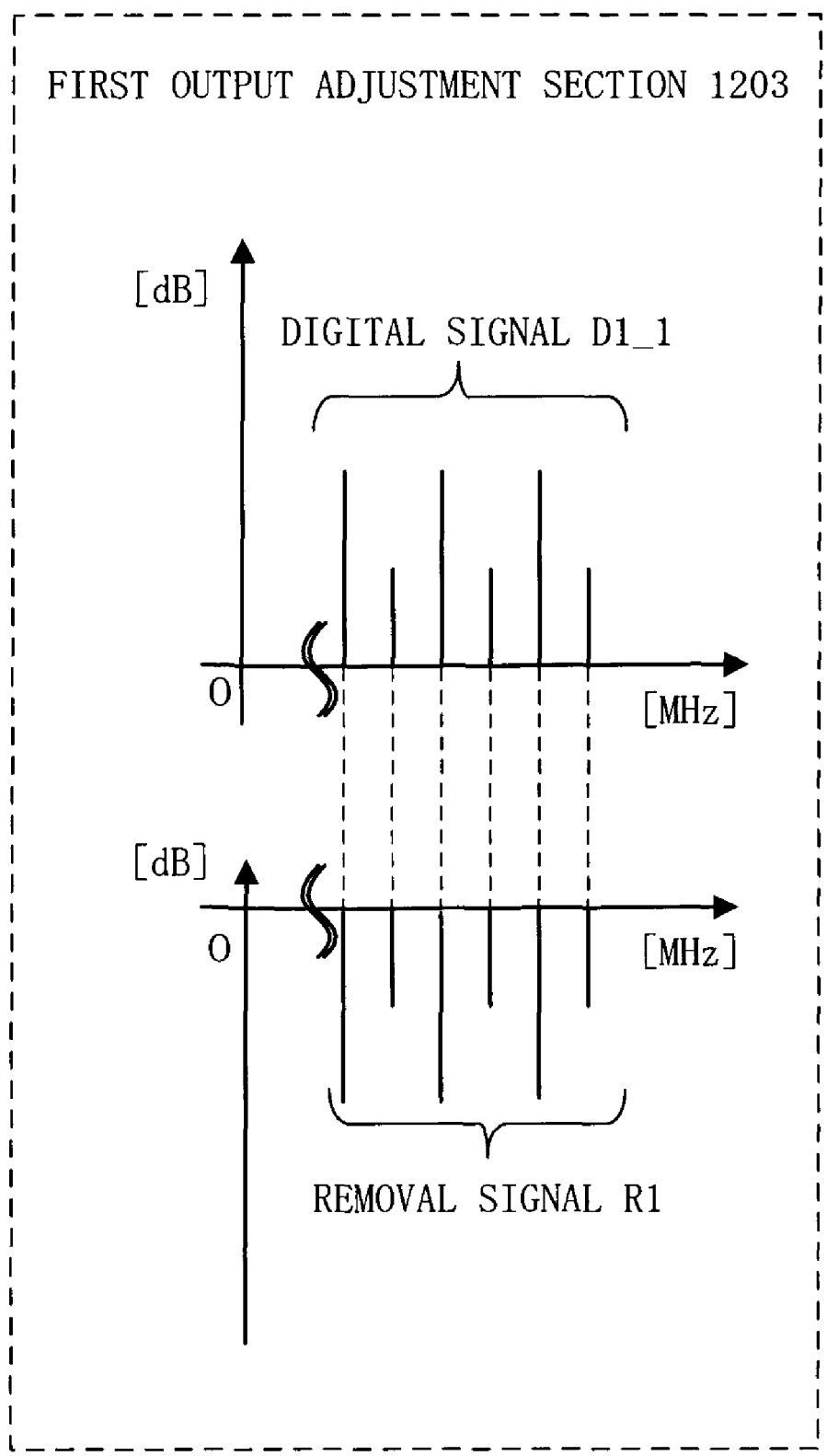
FIG. 18A is a diagram illustrating an operation performed by a first output adjustment section according to the third embodiment.
Figure 18B:
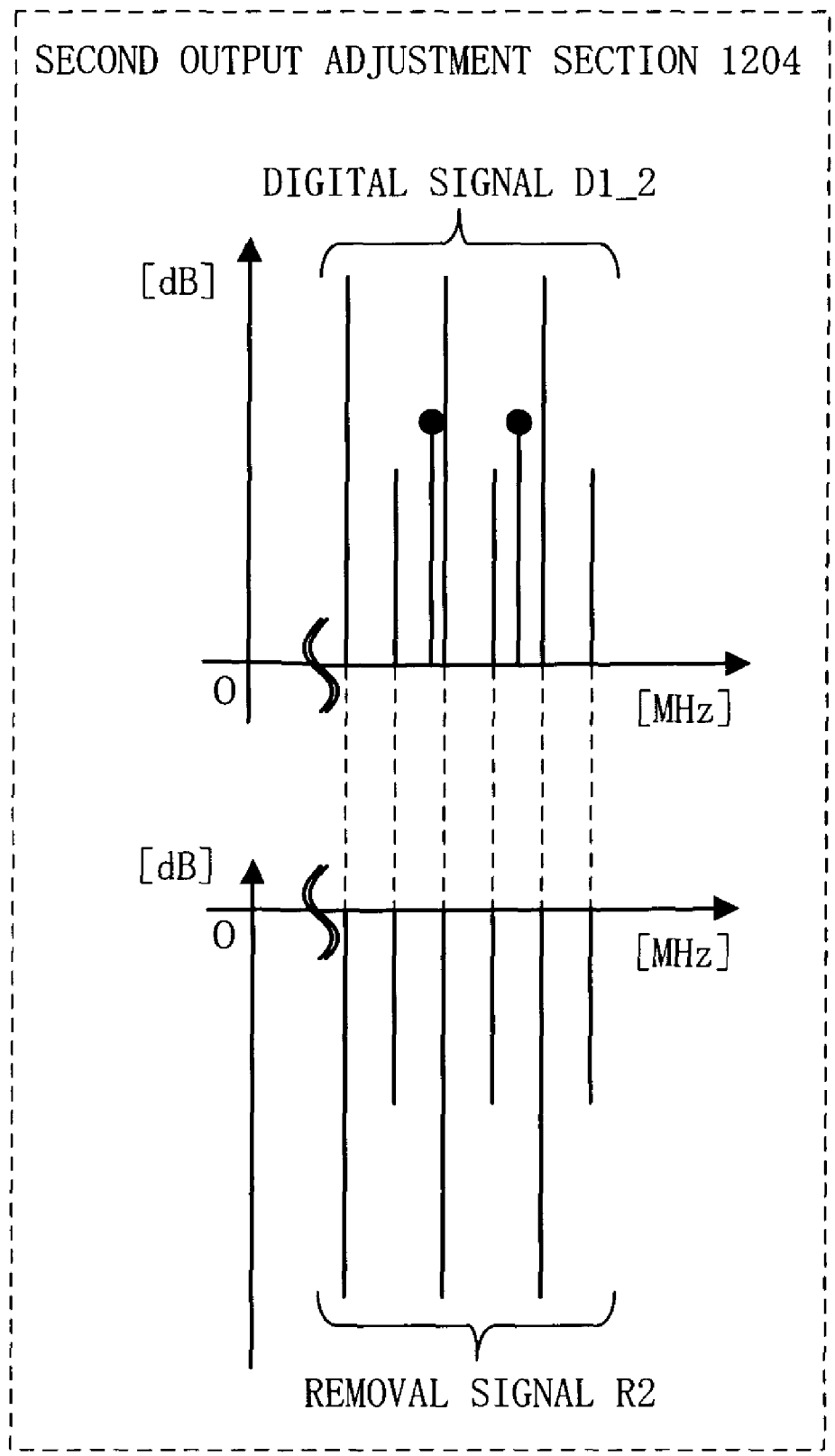
FIG. 18B is a diagram illustrating an operation performed by a second output adjustment section according to the third embodiment.
Figure 18C:
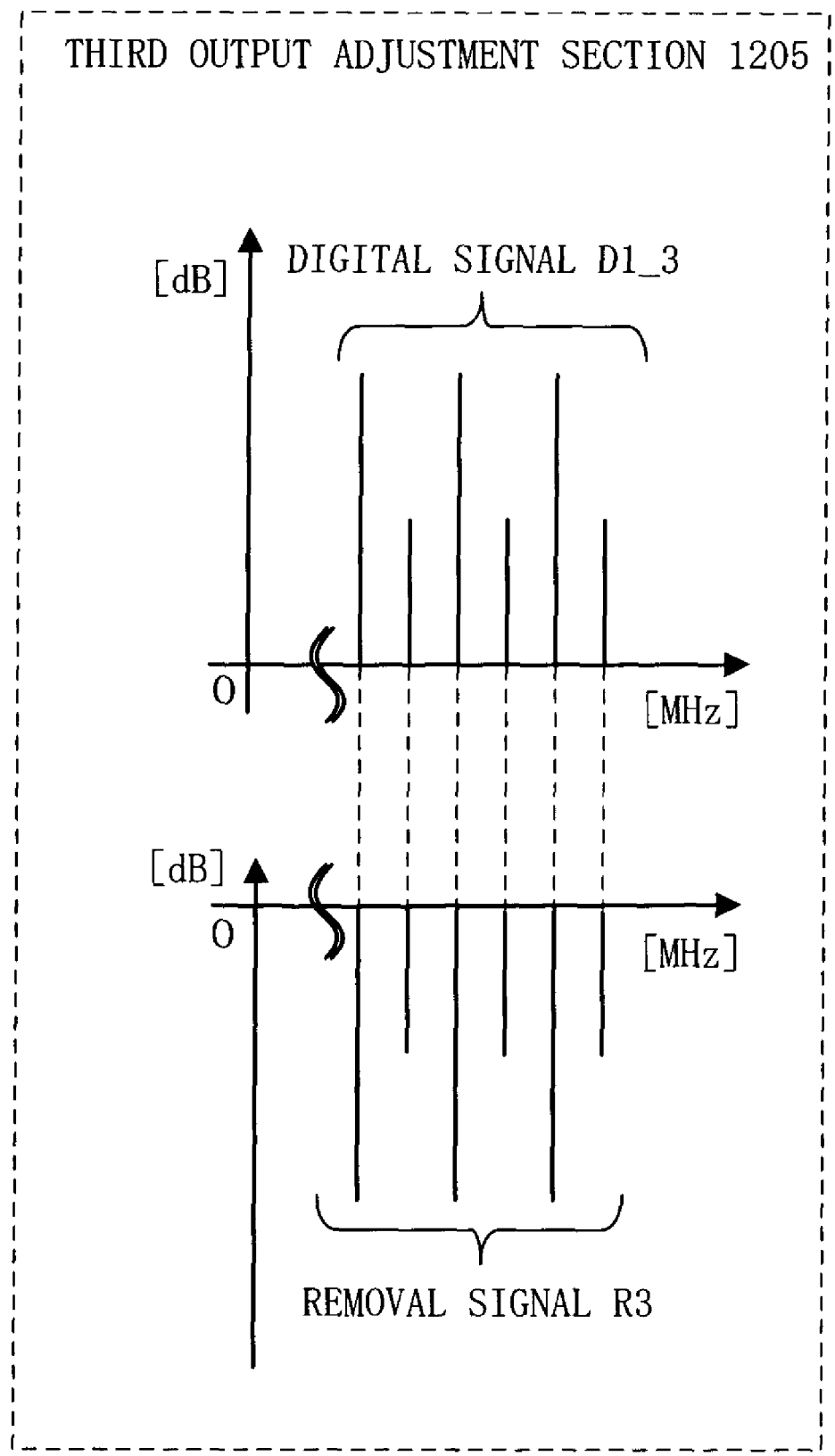
FIG. 18C is a diagram illustrating an operation performed by a third output adjustment section according to the third embodiment.

FIGS. 18A, 18B and 18C are diagrams illustrating operations performed by the first output adjustment section 1203, the second output adjustment section 1204, and the third output adjustment section 1205, respectively. The first output adjustment section 1203 amplifies or attenuates the level of the digital signal D2_1R outputted by the phase adjustment section 1202 so as to conform to a level obtained by inverting a level of the in-vehicle noise included in the digital signal D1_1, in accordance with a first output adjustment signal G1 outputted by the signal combination reconstruction section 1209, as shown in FIG. 18A, and outputs the amplified or attenuated signal as a removal signal R1.

The second output adjustment section 1204 amplifies or attenuates the level of the digital signal D2_2R outputted by the phase adjustment section 1202 so as to conform to a level obtained by inverting a level of the in-vehicle noise included in the digital signal D1_2, in accordance with a second output adjustment signal G2 outputted by the signal combination reconstruction section 1209, as shown in FIG. 18B, and outputs the amplified or attenuated signal as a removal signal R2.

The third output adjustment section 1205 amplifies or attenuates the level of the digital signal D2_3R outputted by the phase adjustment section 1202 so as to conform to a level obtained by inverting a level of the in-vehicle noise included in the digital signal D1_3, in accordance with a third output adjustment signal G3 outputted by the signal combination reconstruction section 1209, as shown in FIG. 18C, and outputs the amplified or attenuated signal as a removal signal R3.

The first output adjustment section 1203, the second output adjustment section 1204, and the third output adjustment section 1205 individually amplify or attenuate the levels of the digital signal D2_1R, the digital signal D2_2R, and the digital signal D2_3R, respectively, which are outputted by the phase adjustment section 1202, so as to generate the removal signal R1, the removal signal R2, and the removal signal R3, respectively. The removal signal R1, the removal signal R2, and the removal signal R3 generated by the first output adjustment section 1203, the second output adjustment section 1204, and the third output adjustment section 1205, respectively, are added to the digital signal D1_1, the digital signal D1_2, and the digital signal D1_3, respectively, so as to remove only the in-vehicle noises included in the digital signal D1_1, the digital signal D1_2, and the digital signal D1_3, respectively.

Figure 19A:
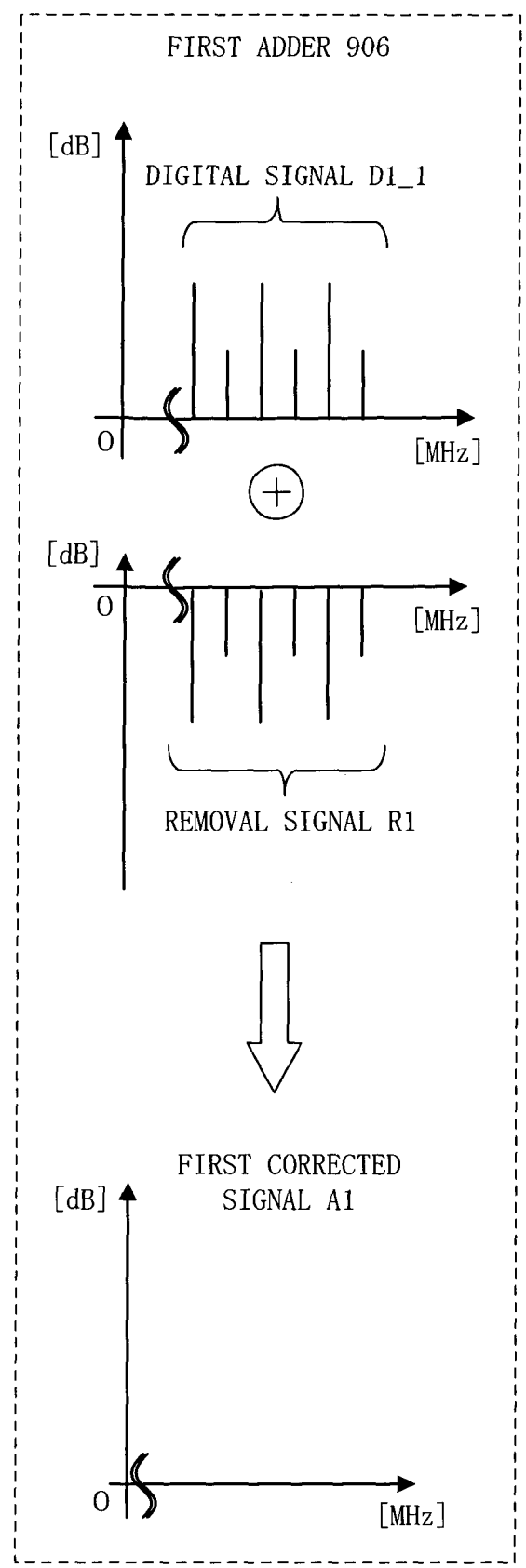
FIG. 19A is a diagram illustrating an operation performed by a first adder according to the third embodiment.
Figure 19B:
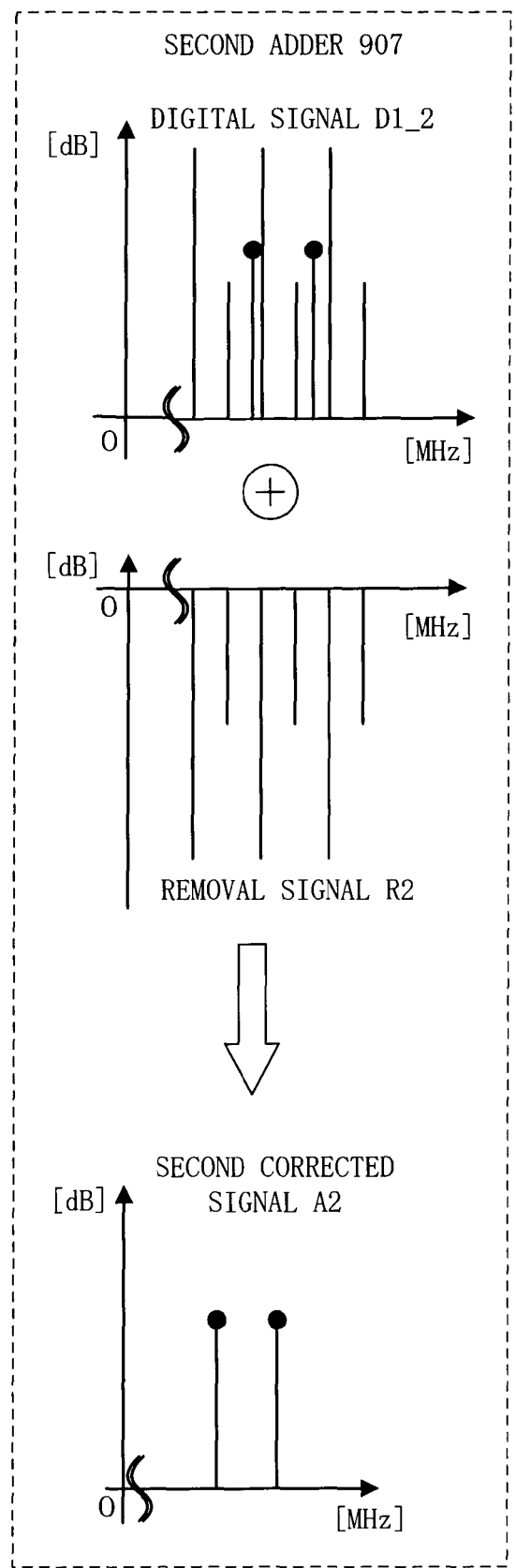
FIG. 19B is a diagram illustrating an operation performed by a second adder according to the third embodiment.
Figure 19C:
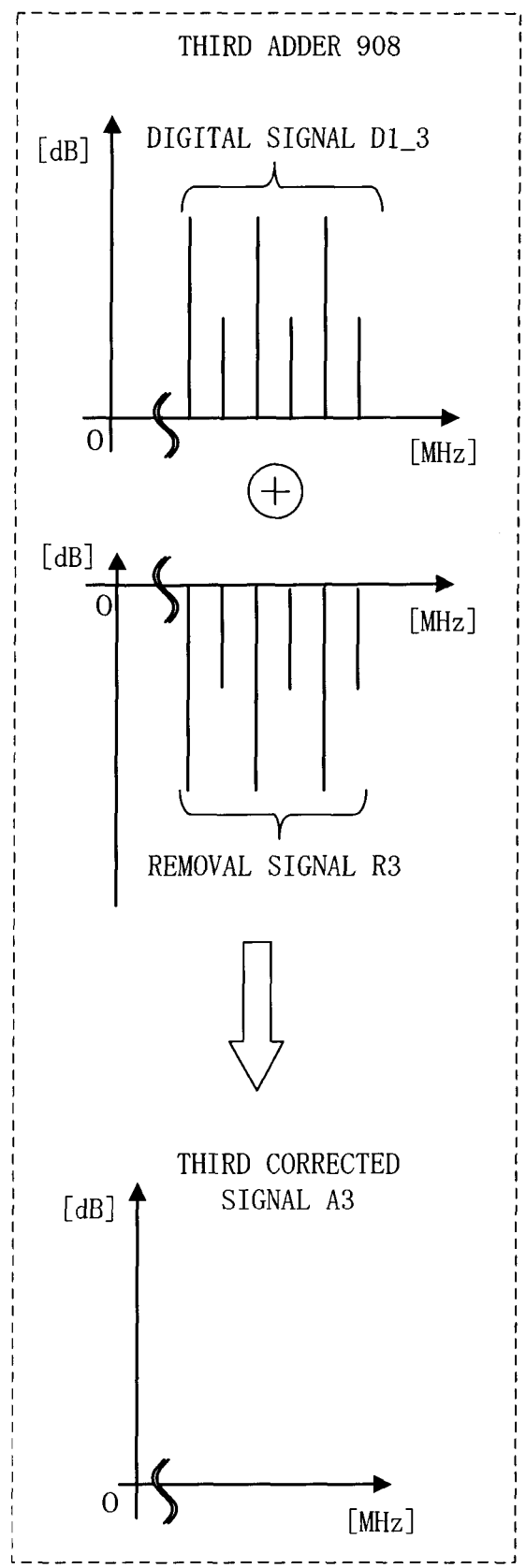
FIG. 19C is a diagram illustrating an operation performed by a third adder according to the third embodiment.

FIGS. 19A, 19B, and 19C are diagrams illustrating operations performed by the first adder 1206, the second adder 1207, and the third adder 1208, respectively. The first adder 1206 adds the removal signal R1 outputted by the first output adjustment section 1203, to the digital signal D1_1 outputted by the predetermined band separation section 1201, as shown in FIG. 19A. The first adder 1206 outputs a signal obtained by the addition, as a first corrected signal, to the signal combination reconstruction section 1209. The first corrected signal outputted by the first adder 1206 is a signal obtained by removing only the in-vehicle noise from the digital signal D1_1.

The second adder 1207 adds the removal signal R2 outputted by the second output adjustment section 1204, to the digital signal D1_2 outputted by the predetermined band separation section 1201, and outputs a signal obtained by the addition, as a second corrected signal A2, to the signal combination reconstruction section 1209, as shown in FIG. 19B, as with the first adder 1206. The third adder 1208 adds the removal signal R3 outputted by the third output adjustment section 1205, to the digital signal D1_3 outputted by the predetermined band separation section 1201, and outputs a signal obtained by the addition, as a third corrected signal A3, to the signal combination reconstruction section 1209, as shown in FIG. 19C, as with the first adder 1206. The second corrected signal A2 and the third corrected signal A3 as well as the first corrected signal do not include the in-vehicle noise.

Figure 20:
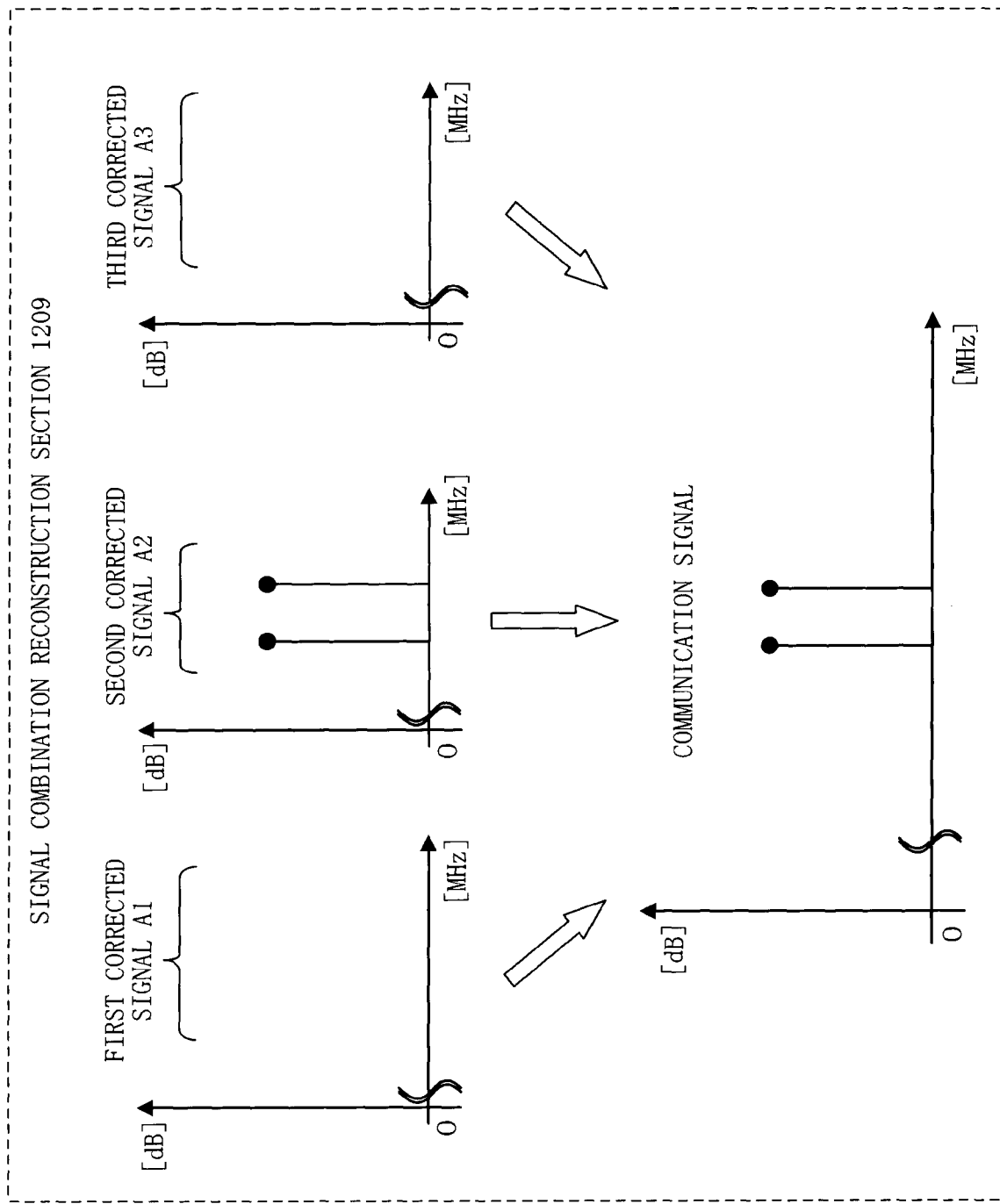
FIG. 20 is a diagram illustrating an operation performed by a signal combination reconstruction section according to the third embodiment.
Figure 21:
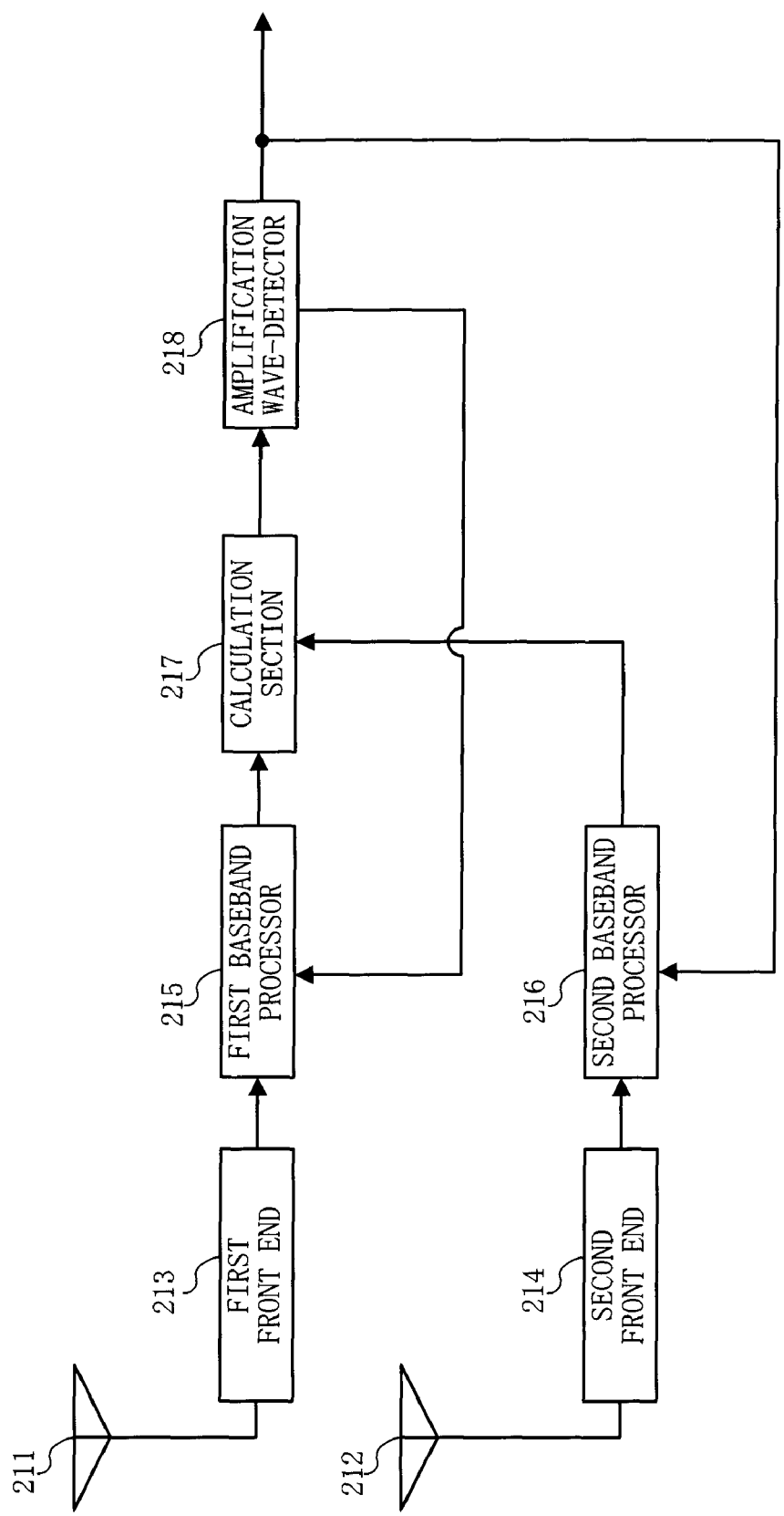
FIG. 21 is a diagram illustrating an outline of a configuration of a conventional radio communication apparatus.

FIG. 20 is a diagram illustrating an operation performed by the signal combination reconstruction section 1209. The signal combination reconstruction section 1209 combines the first corrected signal, the second corrected signal A2, and the third corrected signal A3, so as to reconstruct a signal corresponding to a signal obtained by removing the in-vehicle noise from the digital signal D1. The signal combination reconstruction section 1209 demodulates the reconstructed signal by using a modulation method which is previously defined for the communication signal received by the antenna 31, and outputs, as the demodulated signal DM, a signal obtained by the demodulation. Further, the signal combination reconstruction section 1209 outputs the control signal CS to the phase adjustment section 1202.

The reason the phase adjustment section 1202 controls at least one of a level and a frequency band of each of the digital signal D2_1R, the digital signal D2_2R, and the digital signal D2_3R, in accordance with the control signal CS, will be described. With the passage of time, the level of the in-vehicle noise varies and the intervals at which the in-vehicle noise has peaks change. Therefore, each of the first corrected signal, the second corrected signal A2, and the third corrected signal A3 may include the in-vehicle noise which has not been removed. Therefore, the phase adjustment section 1202 controls the frequency band of each of the digital signal D2_1R, the digital signal D2_2R, and the digital signal D2_3R, in accordance with the control signal CS outputted by the signal combination reconstruction section 1209, such that frequencies at which each of the digital signal D2_1R, the digital signal D2_2R, and the digital signal D2_3R has peak values conform to respective frequencies at which the in-vehicle noise included in each of the digital signal D1_1, the digital signal D1_2, and the digital signal D1_3 has peak values. Thus, the phase adjustment section 1202 is allowed to generate the digital signal D2_1R, the digital signal D2_2R, and the digital signal D2_3R which are able to effectively remove the in-vehicle noises included in the digital signal D1_1, the digital signal D1_2, and the digital signal D1_3, respectively, even when, with the passage of time, the level of the in-vehicle noise included in each of the digital signal D1_1, the digital signal D1_2, and the digital signal D1_3 varies, and the intervals at which the in-vehicle noise included in each of the digital signal D1_1, the digital signal D1_2, and the digital signal D1_3 has peak values change.

The control signal CS may be, for example, a signal indicating that each of the first corrected signal, the second corrected signal A2, and the third corrected signal A3 includes a noise which has not been removed. Thus, the signal combination reconstruction section 1209 outputs the control signal CS so as to notify the phase adjustment section 1202 that each of the first corrected signal, the second corrected signal A2, and the third corrected signal A3 includes the noise which has not been removed. Therefore, the phase adjustment section 1202 is allowed to control the frequency band of each of the digital signal D2_1R, the digital signal D2_2R, and the digital signal D2_3R such that each of the first corrected signal, the second corrected signal A2, and the third corrected signal A3 is prevented from including the noise which has not been removed.

Further, the control signal CS may be, for example, a signal indicating that, in each of the first corrected signal, the second corrected signal A2, and the third corrected signal A3 (in the present embodiment, the communication signal is included in only the second corrected signal A2), a level of the communication signal is not 10 dB or more higher than a level of a noise which has not been removed. Thus, when the signal combination reconstruction section 1209 outputs the control signal CS to the phase adjustment section 1202, the phase adjustment section 1202 is allowed to control the frequency bands of the digital signal D2_1R, the digital single D2_2R, and the digital signal D2_3R such that, in each of the first corrected signal, the second corrected signal A2, and the third corrected signal A3, the level of the communication signal is higher than the level of the noise, and a difference between the level of the communication signal and the level of the un-removed noise in each of the first corrected signal, the second corrected signal A2, and the third corrected signal A3, is further increased.

In the third embodiment, the in-vehicle noise included in the digital signal D1 does not have a constant level as described above. Therefore, if the digital signal D1 remaining unseparated and the digital signal D2 remaining unseparated are used as in the first embodiment, even when the digital signal D2 for which the phase and the frequency band have been adjusted is added to the digital signal D1, it is impossible to remove the in-vehicle noise shown in FIG. 14.

Therefore, the digital signal processor 121 according to the third embodiment separates the digital signal D1 into three signals and separates the digital signal D2 into three signals. The phase, frequency band, and level are adjusted for each of the digital signal D2_1, the digital signal D2_2, and the digital signal D2_3, and the digital signal D2_1, the digital signal D2_2, and the digital signal D2_3 for each of which the phase, frequency band, and level have been adjusted are added to the digital signal D1_1, the digital signal D1_2, and the digital signal D1_3, respectively. Thus, the digital signal processor 121 according to the third embodiment is allowed to effectively remove the in-vehicle noise which is included in the digital signal D1 and does not have a constant level.

In the third embodiment, each of the digital signal D1 and the digital signal D2 is separated into three signals. However, each of the digital signal D1 and the digital signal D2 may be separated into any number of signals depending on an intensity of the communication signal received by the radio communication apparatus 120 and/or a type of the in-vehicle noise.

In the third embodiment, the control signal CS, the first output adjustment signal G1, the second output adjustment signal G2, and the third output adjustment signal G3 are outputted based on a level of a signal reconstructed by the signal combination reconstruction section 1209. However, the digital signal processor 121 may have a predetermined signal removal section and a control section as described in the second embodiment, so as to control the phase adjustment section 1202, the first output adjustment section 1203, the second output adjustment section 1204, and the third output adjustment section 1205, based on a level of an un-removed in-vehicle noise included in the demodulated signal DM.

The components of each of the digital signal processor 35, the digital signal processor 101, and the digital signal processor 121 may be manufactured by using a digital filter designed by using, for example, a designing technique such as a Z-transform.

While the invention has been described in detail, the foregoing description is in all aspects illustrative and not restrictive. It is understood that numerous other modifications and variations can be devised without departing from the scope of the invention.

What is claimed is:

1. A noise removal apparatus for processing a signal including a communication signal having been modulated and a noise, the noise removal apparatus comprising:
   a band separation section for separating the signal including the communication signal and the noise into a first signal which includes the communication signal and the noise and a second signal which includes only the noise, by using, as an upper-limit boundary, a center frequency of a frequency band of the communication signal, and outputting the first signal and the second signal;
   a conversion section for inverting a level of the second signal outputted by the band separation section, performing conversion of a frequency band of the second signal having the level inverted, to a frequency band of the first signal, and outputting, as a removal signal, a signal obtained by the conversion; and
   an adder for performing addition of the first signal to the removal signal, and outputting, as a corrected signal, a signal obtained by the addition.

2. The noise removal apparatus according to claim 1, wherein the conversion section inverts the level of the second signal by shifting a phase of the second signal by 180 degrees.

3. The noise removal apparatus according to claim 1, further comprising
   a signal demodulation section for outputting, as a demodulated signal, a signal obtained by demodulating the corrected signal, and a control signal generated by using the corrected signal, wherein
   the conversion section adjusts, in accordance with the control signal, a frequency band of the second signal obtained by the conversion such that frequencies at which the second signal of the frequency band obtained by the conversion has peak values conform to frequencies, respectively, at which the noise included in the first signal has peak values.

4. The noise removal apparatus according to claim 3, wherein the conversion section adjusts, when the control signal indicates that a level of the communication signal included in the corrected signal is not 10 dB or more higher than a level of the noise which has not been removed and is included in the corrected signal, the frequency band of the second signal obtained by the conversion such that the frequencies at which the second signal of the frequency band obtained by the conversion has the peak values conform to the frequencies, respectively, at which the noise included in the first signal has the peak values.

5. The noise removal apparatus according to claim 1, further comprising
   a signal demodulation section for outputting, as a demodulated signal, a signal obtained by demodulating the corrected signal, and a control signal generated by using the corrected signal, wherein
   the conversion section further increases or reduces, when the control signal indicates that the corrected signal includes the noise having not been removed, the level of the second signal of a frequency band obtained by the conversion so as to reduce the noise included in the corrected signal.

6. The noise removal apparatus according to claim 5, wherein when the control signal indicates that a level of the communication signal included in the corrected signal is not 10 dB or more higher than a level of the noise which has not been removed and is included in the corrected signal, the conversion section increases or reduces the level of the second signal of the frequency band obtained by the conversion such that the level of the communication signal included in the corrected signal is higher than the level of the noise which has not been removed and is included in the corrected signal, and a difference between the level of the communication signal included in the corrected signal and the level of the noise which has not been removed and is included in the corrected signal is further increased.

7. The noise removal apparatus according to claim 1, further comprising:
   a signal demodulation section for outputting, as a demodulated signal, a signal obtained by demodulating the corrected signal;
   a signal removal section for performing removal of only a signal obtained by demodulating the communication signal, from the demodulated signal, and outputting, as a noise monitor signal, a signal obtained by the removal; and
   a control section for generating a control signal in accordance with a level of the noise monitor signal, and outputting the control signal having been generated, wherein
   the conversion section adjusts, when the control signal indicates that the level of the noise monitor signal has a value other than zero, a frequency band of the second signal obtained by the conversion such that frequencies at which the second signal of the frequency band obtained by the conversion has peak values conform to frequencies, respectively, at which the noise included in the first signal has peak values.

8. The noise removal apparatus according to claim 1, further comprising:
   a signal demodulation section for outputting, as a demodulated signal, a signal obtained by demodulating the corrected signal;
   a signal removal section for performing removal of only a signal obtained by demodulating the communication signal, from the demodulated signal, and outputting, as a noise monitor signal, a signal obtained by the removal; and
   a control section for generating a control signal in accordance with a level of the noise monitor signal, and outputting the control signal having been generated, wherein
   the conversion section further increases or reduces, when the control signal indicates that the level of the noise monitor signal has a value other than zero, the level of the second signal of a frequency band obtained by the conversion such that the level of the noise monitor signal is further reduced.

9. The noise removal apparatus according to claim 1, further comprising:
   a first separation section for separating the first signal into a plurality of signals, and outputting the plurality of signals; and
   a second separation section for separating the second signal into a number of signals equal to the plurality of signals obtained by separating the first signal by the first separation section, and outputting the number of signals equal to the plurality of signals, wherein
   the conversion section inverts levels of the second signal having been separated by the second separation section, and performing conversion of frequency bands of the second signal which has been separated by the second separation section and has the levels inverted, to frequency bands, respectively, of the first signal having been separated into the plurality of signals by the first separation section, so as to output the removal signal having been separated, and the adder adds the plurality of signals obtained by separating the first signal by the first separation section, to the removal signal, respectively, having been separated, so as to output the corrected signal having been separated, the noise removal apparatus further comprising a signal combination demodulation section for outputting, as a demodulated signal, a signal obtained by combining and demodulating the corrected signal having been separated.

10. The noise removal apparatus according to claim 9, further comprising an output adjustment section for increasing or reducing levels of the removal signal having been separated such that the levels of the removal signal having been separated conform to levels obtained by inverting levels of the noise included in the first signal having been separated into the plurality of signals by the first separation section, so as to output the removal signal having the levels increased or reduced, wherein the adder adds the first signal having been separated into the plurality of signals by the first separation section, to the removal signal which has been separated and outputted by the output adjustment section, so as to output the corrected signal having been separated.

* * * * *